TABLE VI-continued

| Blended Surfactant | F | G | AA /1/ |
|---|---|---|---|
| Hexylene glycol, pts. by wt. | 15 | 15 | 15 |

/1/ Not a surfactant of the invention.
/2/ Prepared in accordance with Example 3.
/3/ Prepared in accordance with Example 5.
/4/ Block copolymer having the average composition, $Me_3SiO[Me_2SiO]_{5.4}$ $[MeO(C_2H_4O)_{7.2}C_3H_6Si(Me)O]_{7.5}SiMe_3$
/5/ In Blended Surfactants F and G, the anionic surfactant was, "Petronate L" which is a sodium petroleum sulfonate having an average molecular weight of 420 and a mineral oil content of 33 weight percent. In Blended Surfactant AA the anionic surfactant was "Bryton 430" which is also a sodium sulfonate of a hydrocarbon mixture having an average molecular weight of 435 and a mineral oil content of 32.7 weight percent.
/6/ An ethylene oxide adduct of nonylphenol in which the average number of moles of ethylene oxide per mole of nonylphenol is about 10.5.

A potency determination was made employing Blended Surfactants F and G as the respective surfactant components of Foam Formulation B (Table IV) employing the blended surfactant at a concentration of one part by weight and following the above-described foaming procedure. The results are given in the following Table VII which also includes corresponding data for Surfactant AA as Run K-1.

TABLE VII

POTENCY STUDY - FOAM FORMULATION B

| Ex. | Blended Surfactant /1/ | Rise (inches) | Breathability (SCFM) | Density (pcf) | CPI |
|---|---|---|---|---|---|
| 16 | F /2/ | 9.0 | 2.4 | 1.39 | 15-20 |
| 17 | G /2/ | 9.0 | 2.3 | 1.38 | 20-25 |
| Run K-1 | AA /2/ | 9.1 | 1.8 | 1.38 | 15-20 |

/1/ One part by weight.
/2/ 0.35 part by weight of silicon-containing component present.

As shown by the data of Table VII, the potency of Blended Surfactants F and G compared favorably with that of comparative Surfactant AA. In regard to Surfactant AA it is noted that when it is used as the surfactant component of flame-retarded Foam Formulation A (Table II) at a level of one part by weight to provide 0.35 parts by weight of the polymethylsiloxane-polyoxyethylene copolymer contained therein, the following results were obtained:

| | |
|---|---|
| Foam Rise | = 6.1 inches |
| Foam breathability | = 0.9 SCFM |
| Foam density | = 1.99 pounds/cubic foot |
| CPI | = 40–45 |
| Flammability (ASTM D-1692-68) Rating | = B |
| Burning time | = 126 seconds |

These results as well as those of Table VII show that, whereas Surfactant AA is capable of stabilizing both flame-retarded and non flame-retarded polyester urethane foam, it does not possess the further desirable property of allowing for the formation of flame-retarded foam of a sufficiently low burning extent to qualify for a self-extinguishing rating by ASTM D-1692-68.

In accordance with the following Examples 18 and 19, further illustrative cyanoalkoxyalkyl-substituted polyalkylsiloxane-polyoxyalkylene copolymers of the invention, designated herein as Surfactants H and J, were prepared. These preparations comprised the platinum-catalyzed hydrosilation reaction between 3-(2-cyanoethoxy)propyl-substituted polymethylsiloxane hydrides, referred to respectively as Si-H Fluids VI and VII, and a methoxy-capped, allyl alcohol-started polyoxyethylene ether (referred to as Polyether B) having the average composition,

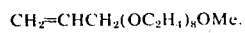

$CH_2=CHCH_2(OC_2H_4)_8OMe$.

The said Si-H reactants were prepared as follows.

PREPARATION OF Si-H FLUID VI

In a 500 ml. capacity 3-necked reaction flask fitted with a mantle, stirrer, thermometer, addition funnel, condenser and nitrogen valves, there were combined 36.7 grams of $Me_3SiO[Me(H)SiO]_{12}SiMe_3$, and 100 ml. of toluene. In the addition funnel were placed 34.7 grams of allyl 2-cyanoethyl ether, $CH_2=CHCH_2OCH_2CH_2CN$, corresponding to about 10 mole percent in excess of the desired stoichiometric reaction which was to react 7/12 of the silanic hydrogen of the Si-H reactant with the ether. After heating the contents of the flask to 95°C., 0.2 ml. of platinum catalyst (prepared by reacting chloroplatinic acid with octyl alcohol as described in U.S. Pat. No. 3,220,972) was added and the addition of the allyl 2-cyanoethyl ether begun. There was a smooth exotherm to 105°C. with addition being completed in 25 minutes at 90°–105°C. After an additional 1.5 hours at 90°C., the reaction product was cooled, treated with one weight percent sodium bicarbonate and 0.5 weight percent of filter aid (Hyflo Super-Cel) and activated charcoal (Darco G-60), followed by pressure filtration and vacuum distillation. The distillate (6.7 grams) boiled up to 37°C./0.7 mm. mercury pressure, and consisted mainly of isomerized and reduced derivatives of the allyl 2-cyanoethyl ether reactant. The residual liquid product (60.2 grams) had a Brookfield viscosity of 236 centipoise and, upon analysis for Si-H content, provided 85.8 cc. $H_2$/gram. Based upon the aforesaid desired stoichiometric reaction, the liquid product which is referred to herein as Si-H Fluid VI, is assigned the following average composition,

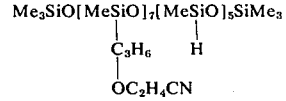

$$Me_3SiO[MeSiO]_7[MeSiO]_5SiMe_3$$
$$\qquad\quad\;\;|\qquad\qquad\;|$$
$$\qquad\quad C_3H_6\quad\;\; H$$
$$\qquad\quad\;\;|$$
$$\qquad\quad OC_2H_4CN$$

PREPARATION OF Si-H FLUID VII

Following substantially the same procedure and applying the hydrosilation reaction conditions described above with reference to Si-H Fluid VI, 49.4 grams of an equilibrated polymethylsiloxane hydride having the average composition,

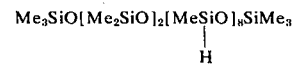

$$Me_3SiO[Me_2SiO]_2[MeSiO]_8SiMe_3$$
$$\qquad\qquad\qquad\qquad\;\;|$$
$$\qquad\qquad\qquad\qquad\;\;H$$

was reacted with 22.2 grams of allyl 2-cyanoethyl ether. The desired stoichiometric reaction was to react 8/8 of the silanic hydrogen of the Si-H reactant with the ether. Work-up of the reaction mixture as above-described provided 7.0 grams of distillate, and 57.3 grams of residual liquid product. The latter product had a Brookfield viscosity of 55 centipoise and, upon analysis for Si-H content, provided 103 cc. $H_2$/gram. Based upon the aforesaid desired stoichiometric reac-

CYANO-ETHER POLYSILOXANE-POLYOXYALKYLENE COPOLYMERS

BACKGROUND OF THE INVENTION

The present invention relates to novel organosilicone polymers, and their use in the manufacture of urethane cellular products, particularly flexible polyester urethane foams including flame-retarded foams.

It is well known that the urethane linkages of urethane foams are formed by the exothermic reaction of a polyfunctional isocyanate and a polyfunctional active hydrogen-containing compound in the presence of a catalyst, and that the cellular structure of the foam is provided by gas evolution and expansion during the urethane-forming reaction. In accordance with the "one-shot process" which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting.

It is also well known that suitable active hydrogen-containing compounds include polyether polyols and polyester polyols. From the standpoint of their chemical structure, therefore, urethanes are usually classified as polyether and polyester urethanes, respectively. Urethane foams also differ with respect to their physical structure and, from this standpoint, are generally classified as flexible, semi-flexible or rigid foams.

Although certain techniques of urethane manufacture such as the "one-shot process" and certain components of the foam formulation such as the polyisocyanates, amine catalyst and blowing agent, are generally useful, a specific problem associated with the production of a particular type of urethane foam and the solution thereto are often peculiar to the particular chemical and physical structure of the desired foamed product. Thus, a significant development in the production of a polyether foam or a rigid foam, for example, may not be generally applicable to the production of other cellular products. In particular, the efficacy of the foam stabilizer is usually selective with respect to the formation of a particular type of foam. For example, although flexible polyester foam was originally made using conventional organic surfactants or emulsifiers, such compounds were not effective for the manufacture of flexible polyether foam. As urethane technology advanced and end-uses became more varied, it became apparent that certain deficiencies in the quality of flexible polyester foam such as the presence of splits and a non-uniform cell structure were attributable, at least in part, to the organic surfactants employed. However, the mere substitution of the organic surfactants with various polysiloxanepolyoxyalkylene block copolymers which had been used as foam stabilizers with satisfactory results in the production of other types of urethane foams (e.g., in the production of polyether urethane foams and certain rigid polyester urethane foams), did not produce completely satisfactory flexible polyester foams.

The search for improved surfactants for stabilization of polyurethane foams is further complicated by the tendency of such foams to ignite readily and burn and the need to reduce their flammability. This characteristic is particularly objectionable in the case of flexible polyurethane foams in view of the use of such foams in many applications where fire is especially hazardous such as, in regard to flexible polyester foam, their use as textile interliners. One approach to reducing flammability of flexible foams is to include a flame-retarding agent such as various phosphorus and/or halogen-containing compounds as a component of the foam-producing reaction mixture. It is found, however, that surfactants which may otherwise be effective stabilizers of non flame-retarded as well as flame-retarded foams, may not possess the further desirable property of allowing for formation of flame-retarded foam of relatively low burning extent.

For example, a significant development in polyester foam manufacture was the discovery that a satisfactory combination of uniform cell structure and freedom from splits was achieved by using a particular combination of foam stabilizing ingredients. This latter combination comprises (a) an anionic organic surfactant that is soluble in the polyester polyol reactant at room temperature and that is capable of lowering the surface tension of the polyester resin reactant when dissolved therein and (b) a polysiloxane-polyoxyalkylene block copolymer surfactant characterized by a particular molecular weight (from 600 to 17,000), siloxane content (from 14 to 40 weight per cent based on the weight of the copolymer) and oxyethylene content (at least 75 weight per cent based on the total amount of oxyalkylene groups in the copolymer). This particular advance in polyester foam manufacture is described in greater detail in U.S. Pat. No. 3,594,334, granted July 20, 1971. From the standpoint of potency and quality of foam product, an especially effective foam stabilizer of the class described in the latter patent is that referred to herein as comparative Surfactant AA in which silicon of the siloxane portion of the block copolymer component is substituted with methyl groups only. It is found that Surfactant AA is also capable of stabilizing flame-retarded polyester urethane foam. However, flammability properties of the foam product are deficient and appear to indicate an adverse effect of the surfactant on flame-retardant efficiency.

It is desirable, therefore, and is a primary object of this invention, to provide a new class of polysiloxane-polyoxyalkylene block copolymers which, in addition to good potency as stabilizers of flexible polyester-based urethane foam, both non flame-retarded and flame-retarded, have the further advantageous property of allowing for the formation of flame-retarded foams of relatively low burning extent.

A further object is to provide flexible polyester urethane foam of substantially reduced combustibility and a method for the manufacture of such foam.

Various other objects and advantages of this invention will become apparent to those skilled in the art from the accompanying description and disclosure.

RELATED APPLICATION

In accordance with the teachings of our copending application Ser. No. 457,510, filed Apr. 3, 1974, now U.S. Pat. No. 3,954,824 a particular class of siloxane-polyoxyalkylene copolymers are described which possess the advantageous property of allowing for formation of flame-retarded polyester polyol-based urethane foam of relatively low burning extent. Among other characteristics, such copolymers comprise difunctional siloxy units in which the two organic radicals bonded to silicon are (1) alkyl and (2) either cyanoalkyl such as cyanopropyl [NC-$C_3H_6$—] or cyanoalkoxy such as cyanopropoxy [NC-$C_3H_6$O—] including combinations of these particular two types of silicon-bonded cyano-bearing groups. Our said copending application, however, does not describe the particular class of novel copolymers to which the teachings of the present invention pertain.

SUMMARY OF THE INVENTION

In accordance with one aspect of the present invention, a particular class of cyano-substituted organosiloxane-polyoxyalkylene polymers are provided which contain chemically combined monofunctional siloxy units ($M_o$) and difunctional siloxy units ($D_o$), an average of from about 2 to about 20 silicon-bonded cyano-bearing ether groups (Q) and an average of from about 2 to about 30 silicon-bonded polyoxyalkylene blocks (E) for every two moles of monofunctional siloxy units ($M_o$) contained in the polymer, the remaining silicon-bonded organic groups being alkyl (R) and at least 75 weight percent of the polyoxyalkylene content of the polymers being constituted of oxyethylene units. As indicated, the essential silicon-bonded cyano-bearing ether groups are collectively referred to herein by the symbol "Q" and have the formula, —(O)$_q$-R'OR''-CN, where $q$ is zero or one, R' is bivalent alkylene having from 3 to 8 carbon atoms, and R'' is bivalent alkylene having from 2 to 4 carbon atoms. Thus, when $q$ is zero, Q is cyanoalkoxyalkyl (that is, NC-R''O-R'—) and, when $q$ is one, Q is cyanoalkoxyalkoxy (that is, NC-R''O-R'O—). In either case, the cyano substituent is bonded to carbon of the alkylene ether group, —R''OR'—, which is in contrast to the composition of the polymers described and claimed in our aforementioned copending application Ser. No. 457,510 in which cyano is present as silicon-bonded cyanoalkyl or cyanoalkoxy.

In the monofunctional siloxy units encompassed by $M_o$, the respective silicon atoms are bonded to two alkyl groups (R), the third silicon-bonded organic group being the aforesaid cyano-bearing ether group (Q), polyoxyalkylene block (E) or alkyl group (R). Thus, included within the scope of $M_o$ are monofunctional units having the following unit formulae which for brevity are also individually referred to herein as the M, M' and M'' units, as shown:

$M = (R)_3SiO_{1/2}$
$M' = (E)(R)_2SiO_{1/2}$
$M'' = (Q)(R)_2SiO_{1/2}$

In any given polymer composition of the present invention, the $M_o$ units may be the same as or different from one another. In the difunctional siloxy units encompassed by $D_o$, at least one of the two organic groups bonded to the respective silicon atoms is alkyl and the second silicon-bonded organic group is Q, E or R. Thus, included within the scope of $D_o$ are difunctional units have the following unit formulae which, for brevity, are also individually referred to herein as the X, Y and Z units, as shown:

$X = (R)_2SiO_{2/2}$
$Y = (Q)(R)SiO_{2/2}$
$Z = (E)(R)SiO_{2/2}$

The organosiloxane-polyoxyalkylene polymers described herein may contain any combination or subcombination of the respective siloxy units within the scope of $M_o$ and $D_o$ provided an average of from about 2 to about 20 cyano-bearing ether groups (Q) and from about 2 to about 30 polyoxyalkylene blocks (E) are present, as encompassed by the following Formula I,

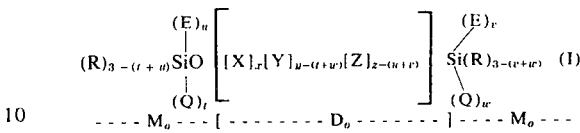

wherein: Q, E, R, X, Y and Z have the aforesaid significance; each of $t$, $u$, $v$, $w$, the sum $t+u$ and the sum $v+w$ independently has a value of zero or one; each of the sum $t+w$ and the sum $u+v$ independently has a value of zero, one or two, it being evident that the value of the sum $t+u+v+w$ is also zero, one or two; $x$ is zero or any positive number having an average value up to about 20; $y$ has an average value from about 2 to about 20; and $z$ has an average value from about 2 to about 30. It is evident from Formula I that $x$, $y-(t+w)$ and $z-(u+v)$ designate the average number of moles of the respective difunctional X, Y and Z units which are present for every two moles of total monofunctional units ($M_o$) as shown, and that the values of $y$ and $z$ correspond to the total number of Q and E groups, respectively, contained in the polymer. Further, when $t+w$ and $u+v$ are zero, $y$ and $z$ also correspond to the respective total number of difunctional Y and Z units contained in the polymer for every two moles of $M_o$.

In accordance with another aspect of the present invention, there is provided a process for producing flexible polyurethane foam which comprises reacting and foaming a reaction mixture of: (a) a polyester polyol reactant containing an average of at least two hydroxyl groups per molecule; (b) a polyisocyanate reactant containing at least two isocyanato groups per molecule; (c) a blowing agent; (d) a catalyst comprising a tertiary-amine; and (e) a foam stabilizing component comprising the cyano-substituted organosiloxane-polyoxyalkylene polymers of the present invention. In addition to their efficacy as stabilizers of polyester-based urethane foams, it has been found that the organosilicone polymers of this invention possess the further advantageous property of allowing for the formation of flame-retarded foams of reduced combustibility and acceptable overall quality. In accordance with this aspect of the present invention, flame-retarded flexible polyester-based urethane foams are provided by reacting and foaming reaction mixtures which additionally include a flame-retarding agent.

In providing the polyurethane foams of the invention, the cyano-substituted organosiloxane-polyoxyalkylene polymers can be introduced to the foam producing reaction mixtures either as such, as a blend with various organic additives including organic surfactants, or in combination with one or more of the polyester polyol reactant, blowing agent, amine catalyst and, when used, the flame-retarding agent.

The present invention also relates to various methods for the preparation of the novel organosiloxane-polyoxyalkylene polymers described herein. One such method comprises the reaction of: (1) polyoxyalkylene reactants which at one end are either hydroxyl-terminated or end-blocked by an olefinically unsaturated group, with (2) cyano-substituted polyalkylsiloxane hydrides having the average composition expressed by the following Formula II,

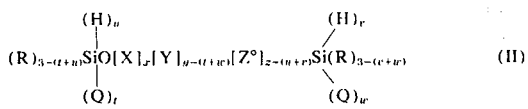

wherein: $Z°$ is the difunctional hydro-alkylsiloxy unit, $(H)(R)SiO_{2/2}$; X is $(R)_2SiO_{2/2}$; Y is $(Q)(R)SiO_{2/2}$; and, as defined with respect to Formula I, the respective average values of $x$, $y$, and $z$ are zero or a positive number up to about 20 ($x$), from about 2 to about 20 ($y$), from about 2 to about 30 ($z$), the value of $t$, $u$, $v$, $w$, $t+u$ and $v+w$ is zero or one, and the value of $t+w$ and $u+v$ is zero, one or two, the respective values of these various parameters corresponding to those of any given polymer composition encompassed by Formula I. Another method for producing copolymers of the invention comprises the overall reaction of reactant (1) above, (2) olefinically unsaturated cyanoalkyl ethers or hydroxyalkyl cyanoalkyl ethers and (3) polyalkylsiloxane hydrides having the average composition,

 (III)

wherein: M, X, $Z°$ and $x$ are as previously defined, and the value of $y+z$ corresponds to that of the sum $y+z$ of any given copolymer composition within Formula I.

DETAILED DESCRIPTION OF THE INVENTION AND PREFERRED EMBODIMENTS

The functionality of the respective types of structural units encompassed by $M_o$ and $D_o$ of the polymers of this invention denotes the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si-O-Si'— bonds. Accordingly, in expressing the individual formulas of the respective units of the polymers of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom. In view of their monofunctionality, the $M_o$ units are chain terminating or end-blocking units and the respective oxygen atoms thereof are shared with silicon of one other unit which can be Y or Z and, when present, X. On the other hand, X, Y and Z are difunctional and thus the respective two oxygen atoms associated with each silicon atom therof are shared with respective silicon atoms of other units. Thus, the reoccurring difunctional units may be distributed in the polymer randomly, alternately, as sub-blocks of repeating units of the same type, or in any combination of such arrangements. Further, the polymers of the invention comprise mixtures of polymer species which differ in molecular weight, total polyoxyalkylene and siloxane contents, and in the type, arrangement and relative proportions of units. Therefore, as expressed herein, the parameters employed to denote these variables are average values and are based on the relative proportions of reactants from which the various units are derived. It is to be further understood that, consistent with convention in the art to which the present invention pertains, as expressed herein, the formulas of the polymers indicate their overall average empirical composition rather than any particular ordered arrangement of units or molecular weight of any particular polymer species. With this understanding, the average composition of the respective types of polymers encompassed by Formula I above may be expressed by the following formulae wherein the various siloxy units are shown in chemically combined form:

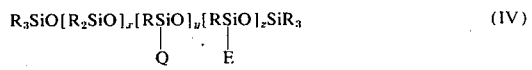 (IV)

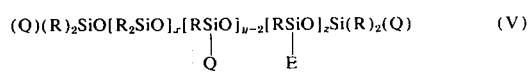 (V)

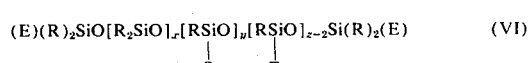 (VI)

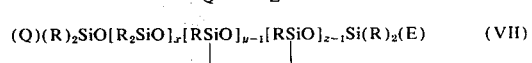 (VII)

wherein: R, Q, E, $x$, $y$ and $z$ are as above defined.

The silicon-bonded R groups are alkyls having from one to ten carbon atoms including linear and branched alkyls. Illustrative of suitable groups encompassed by R are: methyl, ethyl, n-propyl, isopropyl, n-butyl, t-butyl, pentyl, hexyl, octyl and decyl. Of the various groups represented by R, the lower alkyls (that is, those having from one to four carbon atoms) are preferred of which methyl is especially suitable. It is to be understood that the R groups may be the same throughout the polymer or they may differ as between or within units without departing from the scope of this invention. For example, when the endblocking monofunctional units are M, that is, $R_3SiO_{1/2}$, they may be trimethylsiloxy units and the difunctional units, $R_2SiO_{2/2}$, when present, may be diethylsiloxy and/or methylethylsiloxy units.

In the Q grouping of the Y and M'' units, that is, in $-(O)_qR'OR''-CN$, R' and R'' are bivalent alkylene radicals of the series, $-C_cH_{2c}-$ and $-C_dH_{2d}-$ respectively, where $c$ is an integer having a value from 3 to 8 ($-R'-$) and $d$ is an integer having a value from 2 to 4 ($-R''-$). Illustrative of suitable groups encompassed by $-R''-$ are ethylene ($-CH_2CH_2-$); trimethylene ($-CH_2CH_2CH_2-$); propylene $[-CH_2CH(CH_3)-]$; and tetramethylene $[-(CH_2)_4-]$. Illustrative of suitable groups encompassed by R' are: trimethylene, propylene, tetramethylene, sec-butylene, hexylene and octylene. The preferred R' groups have from three to four carbon atoms, and may be the same as or different from R''. It is to be understood that the polymer may contain any combination of cyanoalkoxyalkyl (NC-R''O-R'—) and/or cyanoalkoxyalkoxy (NC-R''O-R'O—) groups encompassed by Q. For example, the Y units of any particular polymer composition may be one or more of the following: 3-(2-cyanoethoxy)propyl methylsiloxy; 3-(3-cyanopropoxy)propyl methylsiloxy; 3-(2-cyanoethoxy)propoxy methylsiloxy; 3-(2-cyanoethoxy)propyl ethylsiloxy; 3-(2-cyanoethoxy)-2-methylpropyl methylsiloxy; 8-(2-cyanoethoxy)octyl methylsiloxy; 3-(2-cyano-2-methylethoxy)propyl methylsiloxy; 3-(2-cyano-2-ethylethoxy)propyl methylsiloxy; and the like. Further, when the polymers of the invention contain Q-modified monofunctional units (M''), such units may be 3-(2-cyanoethoxy)propyl dimethylsiloxy; 3-(2- cyanoethoxy)propoxy dimethylsiloxy; 3-(2-cyanoethoxy)propyl diethylsiloxy; 3-(2-cyanoethoxy)propyl methylethylsiloxy; and the like.

The average composition of the preferred polyoxyalkylene blocks (E) of the Z and M' units is, $-(R)^\circ_p-(OC_aH_{2a})_b-OG$, wherein: $p$ is zero or one; $-R^\circ-$ comprises a bivalent alkylene group a carbon atom of which is bonded to silicon; $-(OC_aH_{2a})_b-$ represents a polyoxyalkylene chain having an average oxyethylene content of at least 75 weight percent; and G is an organic cap. In the chain, $-(OC_aH_{2a})_b-$, $a$ can have a value from 2 to 4 provided at least 75 weight percent of the total polyoxyalkylene content of the polymer is constituted of oxyethylene units, and $b$ has an average value from about 3 to about 30. Usually, the average value of $b$ is from about 4 to about 15, and the average value of $a$ is from 2 to 2.25. The other oxyalkylene units with which oxyethylene may be in combination are oxypropylene, $-(C_3H_6O)-$, and oxybutylene, $-(C_4H_8O)-$, units. When the oxyethylene units are present in combination with other oxyalkylene units, the units of different types can be randomly distributed throughout the poly(oxyalkylene) chain or they can be grouped in respective sub-blocks, provided the total average content of $-(C_2H_4O)-$ is at least 75 weight percent. Preferably, the total average poly(oxyethylene) content of the polymers is from about 85 to about 100 weight percent.

When present, the linking group ($-R^\circ-$) between silicon and that portion of the polyoxyalkylene block shown as $-(OC_aH_{2a})_bOG$, is a bivalent alkylene group, an alkylene-C(O)— group or an —alkylene-NH-C(O)— group wherein the free valence of alkylene of the latter two groups is bonded to silicon. In these linking groups, alkylene has the more specific formula, $-C_eH_{2e}-$, where $e$ has a value from 2 to 6 and is usually no more than four. Illustrative of suitable groups encompassed by $R^\circ$ are: ethylene, trimethylene, propylene, tetramethylene, hexamethylene; corresponding $-C_eH_{2e}-C(O)-$ groups which together with oxygen of the polyoxyalkylene chain form an ester linkage; and corresponding $-C_eH_{2e}-NH-C(O)-$ groups which in combination with oxygen of the polyoxyalkylene chain form carbamate linkages.

As further indicated by the formula of the polyoxyalkylene blocks (E) of the Z and M' units, the poly(oxyalkylene) chain is terminated by the organic groups, GO—, wherein G is a monovalent organic capping group. Illustrative of the organic caps encompassed by G are such groups as: $R^{\infty}-$, $R^{\infty}NHC(O)-$, and $R^{\infty}C(O)-$, wherein $R^{\infty}$ is a monovalent hydrocarbon radical having from 1 to 12 carbon atoms, and is usually free of aliphatic unsaturation. the groups (GO—) which endblock the polyoxyalkylene chains are, therefore, corresponding $R^{\infty}O-$, $R^{\infty}NHC(O)O-$ and $R^{\infty}C(O)O-$ monovalent organic radicals. In the aforesaid capping (G) and terminal (GO—) groups, $R^{\infty}$ can be any of the following: an alkyl group including linear and branched chain alkyl groups having the formula, $C_fH_{2f+1}-$, wherein $f$ is an integer from 1 to 12, such as, for example, methyl, ethyl, n-propyl, isopropyl, n-butyl, octyl and dodecyl groups; a cycloaliphatic radical including monocyclic and bicyclic groups such as, for example, cyclopentyl, cyclohexyl and bicyclo[2.2.1-]heptyl groups; and aromatically unsaturated group including aryl, alkaryl and aralkyl radicals such as, for example, phenyl, naphthyl, xylyl, tolyl, cumenyl, mesityl, t-butylphenyl, benzyl, beta-phenylethyl and 2-phenylpropyl groups; alkyl- and aryl-substituted cycloaliphatic radicals such as, for example, methylcyclopentyl and phenylcyclohexyl radicals; and the like. It is evident, therefore, that the terminal group (GO—) of the polyoxyalkylene chain can be corresponding alkoxy, aryloxy, aralkoxy, alkaryloxy, cycloalkoxy, acyloxy, aryl-C(O)O—, alkyl carbamate and aryl carbamate groups.

The generally preferred $R^{\infty}$ groups are phenyl, lower alkyl radicals, the lower alkyl-substituted aryl groups and the aryl-substituted lower alkyl groups, wherein the term "lower alkyl" denotes $C_1$-$C_4$ alkyl radicals. Therefore, illustrative of the preferred capping groups represented by G are: methyl, ethyl, propyl, butyl, phenyl, benzyl, phenylethyl ($C_6H_5$-$C_2H_4-$), acetyl, benzoyl, methylcarbamyl [$CH_3NHC(O)-$], ethylcarbamyl [$C_2H_5NHC(O)-$], propyl- and butyl-carbamyl groups, phenylcarbamyl [$C_6H_5NHC(O)-$], tolylcarbamyl [$(CH_3)C_6H_4NHC(O)-$], benzylcarbamyl [$C_6H_5CH_2NHC(O)-$], and the like.

It is to be understood that the terminal organic radical (GO—) of the respective polyoxyalkylene blocks of the polymers of the present invention may be the same throughout the polymer or may differ. For example, the polymer compositions of this invention can contain polyether blocks in which the terminal group (GO—) is methoxy, and other polyether groups in which GO— is a hydrocarbylcarbamate group such as methylcarbamate, $CH_3NHC(O)O-$, or benzyloxy ($C_6H_5CH_2O-$).

When used to stabilize polyester polyol-derived flexible foam, an average of from about 50 to about 85 weight percent of the cyano-substituted organosiloxanepolyoxyalkylene polymers of the invention is constituted of polyoxyalkylene blocks (E) which portion of the polymers is also referred to herein as the total polyether content. Correspondingly, the total siloxane content of the polymers is from about 50 to about 15 weight percent, and represents the sum of the combined weight of the units encompassed by $M_o$ and $D_o$ less the total weight of the polyoxyalkylene blocks (E). Within these respective ranges of polyether and siloxane content, the ratio of the combined number of X units and Q groups contained in the M'' and/or Y units to the number of polyoxyalkylene blocks (E) contained in the M' and/or Z units (that is, the mole ratio of x+y:z) is usually from about 0.5:1 to about 6:1, and is most preferably no more than about 4:1.

In the polymers described herein, the alkyls (R) are of course bonded to silicon by silicon-to-carbon bonds. On the other hand, the respective cyano-bearing ether groups (Q) and polyoxyalkylene blocks (E) shown in Formulas I and IV–VII, may be linked to silicon by Si-C or Si-O bonds, as shown in the following formulas:

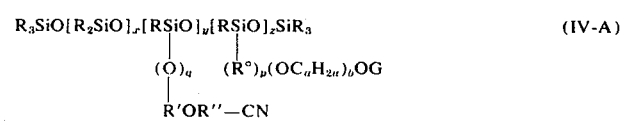

(IV-A)

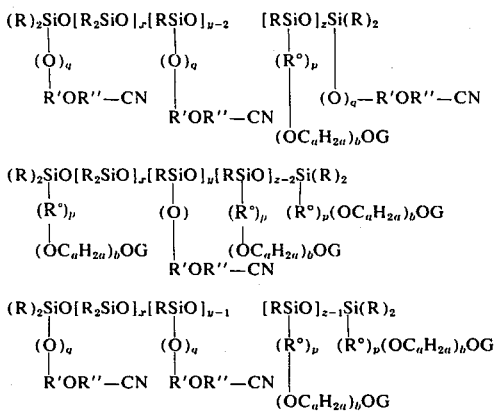

(V-A)

(VI-A)

(VII-A)

wherein, as previously defined, $q$ and $p$ may independently be zero or one. Thus, the cyano-substituted organosiloxane-polyoxyalkylene polymers of the invention may be: (1) non hydrolyzable with respect to both the polyoxyalkylene blocks and cyano-substituted ether groups (when $p$ is one and $q$ is zero); (2) hydrolyzable with respect to both the polyoxyalkylene blocks and cyano-substituted ether groups (when $p$ is zero and $q$ is one); (3) hydrolyzable with respect to the polyoxyalkylene blocks and non hydrolyzable with respect to the cyano-substituted ether groups (when both $p$ and $q$ are zero); and (4) non hydrolyzable with respect to the polyoxyalkylene blocks and hydrolyzable with respect to the cyano-substituted ether groups (when both $p$ and $q$ are one).

Generally preferred polymers of the invention are those wherein $x$ is zero or a positive number up to about 10, $y$ is from about 2 to about 10, and $z$ is from about 2 to about 15. When X units are present, $x$ usually has a value of at least about 0.5, and more usually has a value of at least about one.

From the standpoint of use as stabilizers of flame-retarded polyester-based urethane foam, preferred polymers of the invention are those having the average compositions:

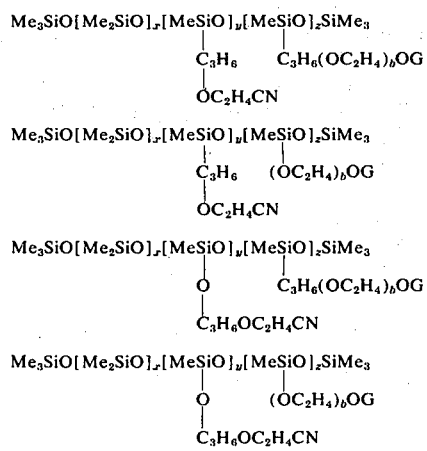

wherein: Me represents methyl; G is $R^{\infty}$—, $R^{\infty}C(O)$— or $R^{\infty}NHC(O)$— in which $R^{\infty}$- is lower alkyl, ar(lower-)alkyl or phenyl; $x$ is zero or a positive number up to about 20 and is usually no more than about 10; $y$ has an average value from about 2 to about 20 and is usually no more than about 10; $z$ has an average value from about 2 to about 30 and is usually no more than about 15; $b$ has an average value from about 3 to about 30 and is usually from about 4 to about 15; and the values of $x$, $y$, $z$ and $b$ in any given polymer composition are such that the siloxane and polyether contents are within the aforesaid ranges from about 15 to about 50 (siloxane) and from about 85 to about 50 (polyether) weight percent.

The polymers of the invention are prepared by any one of a number of reactions, the particular method employed depending primarily on whether the polyoxyalkylene blocks (E) are linked to silicon through an Si-C or Si-O-C linkage and whether the bond between silicon and the cyano-substituted ether groups (Q) is Si-C (that is, when Q is —R'OR''-CN) or Si-O-C (that is, when Q is —O-R'OR''-CN).

One method for providing polymer compositions of the invention in which the polyoxyalkylene blocks of the Z and/or M' units are linked to silicon through Si-C bonds comprises the platinum-catalyzed addition of monoolefinic polyoxyalkylene ethers to the Q-substituted polyalkylsiloxane Si-H fluids encompassed by Formula II hereinabove. This hydrosilation reaction is referred to herein as Method A and is illustrated by the following equation wherein the said Si-H reactant is expressed by Formula II-A, as shown:

EQUATION 1

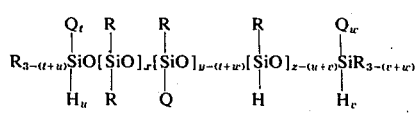

Formula II-A

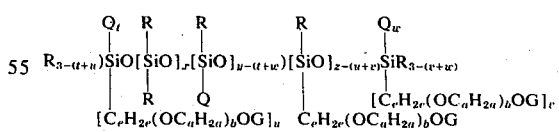

wherein as previously defined herein: Q is the cyano-bearing ether group, —(O)$_q$-R'OR''-CN; R is alkyl; G is an organic cap; —(OC$_a$H$_{2a}$)— is a poly(oxyalkylene) chain constituted of at least 75 weight percent oxyethylene; $e$ has a value from 2 to 6; $t$, $u$, $v$, $w$, $t+u$ and $v+w$ have respective values of zero or one; $t+w$ and $u+v$ have respective values of zero, one or two; $x$ is zero or a positive number having an average value up to about 20; $y$ has an average value from about 2 to about 20; and $z$ has an average value from about 2 to about 30.

Preferably, the monoolefinic group, $-C_cH_{2c-1}$, of the polyether reactant employed in Method A is vinyl, allyl or methallyl, the allyl end-blocked reactants being especially suitable. One method for preparing such polyether reactants comprises starting alkylene oxide polymerization with an alkenol having at least three carbon atoms such as allyl alcohol to provide $HO(C_aH_{2a}O)_b$-$C_cH_{2c-1}$ (wherein $e$ has a value of at least 3), followed by capping of the terminal hydroxyl group with the aforesaid organic radical G—, such as methyl, phenyl, benzyl, acetyl, methylcarbamyl and like capping groups. Further details concerning the method of preparation of such polyether reactants are as described in British Patent Specification Nos. 1,220,471 and 1,220,472. Alternatively, the polyether reactants can be prepared by starting the alkylene oxide polymerization with an alkanol such as methanol or butanol, an aralkyl alcohol such as benzyl alcohol, phenol and the like, followed by capping of the terminal hydroxyl group of the reaction product with the monoolefinic group such as vinyl, allyl, methallyl and the like. Of these monoolefinically unsaturated polyether reactants, allyl alcohol-started polyoxyalkylene ethers are especially suitable. It is to be understood that the polyoxyalkylene chain, $-(C_aH_{2a}O)_b-$, of the polyether reactants is composed of at least 75, preferably at least 85, weight percent of oxyethylene units, $-(C_2H_4O)-$, the remaining oxyalkylene units being oxyethylene, oxypropylene and/or oxybutylene, as described hereinabove with reference to the nature of the polyoxyalkylene blocks (E) of the copolymeric product. When oxyethylene is in combination with other oxyalkylene units, the various oxyalkylene units can be randomly distributed throughout the chain such as when a mixture of alkylene oxides is polymerized, or they can be arranged as sub-blocks such as when the respective alkylene oxides are polymerized sequentially.

The polymers of this invention wherein polyoxyalkylene blocks are joined to silicon through an Si-O-C bond (that is, the compositions encompassed by Formulas IV-A through VII-A above wherein $p$ is zero), are provided by the catalyzed condensation of silicon-bonded hydrogen of the Q-substituted polyalkylsiloxane hydride fluids with hydrogen of the —OH group of hydroxyl-terminated polyether reactants. This method is referred to herein as Method B and is illustrated by the reaction of the following equation 2 in which the said hydride reactant has the average composition expressed by Formula II-A shown in above equation 1.

EQUATION 2

Si—H Reactant of Formula II-A + z HO—$(C_aH_{2a}O)_bG$ ⟶

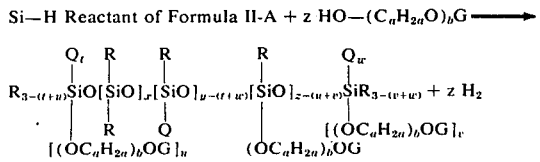

wherein: Q, R, G, $-(OC_aH_{2a})_b-$, $t$ through $z$, $t+u$, $v+w$, $t+w$ and $u+v$ have the aforesaid significance such as is summarized with specific reference to equation 1.

From equations 1 and 2 it is evident that when $t$, $u$, $v$ and $w$ are zero, the respective polymer products are endblocked by M units $[(R)_3SiO_{1/2}]$ and the polymer products are of the type encompassed by Formula IV, as illustrated by the following equations 1a and 2a:

Equation 1a

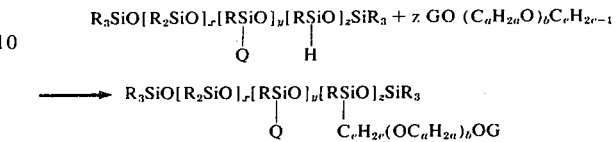

Equation 2a

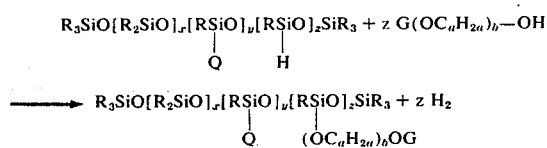

wherein R, Q, G, $x$, $y$, $z$, $a$ and $b$ are as previously defined.

It is also evident from equations 1 and 2 that: (1) when $t$ and $w$ are both one and thus $u$ and $v$ are zero, the end-blocking units are M" $[(Q)(R)_2SiO_{1/2}]$ and the polymer products are of the type encompassed by Formula V; (2) when $t$ and $w$ are both zero and $u$ and $v$ are both one, the endblocking units are M'$[(E)(R)_2SiO_{1/2}]$ and the copolymers are within the scope of Formula VI; (3) when $t$ and $v$ are both one and thus $u$ and $w$ are zero, the copolymers are endblocked by different monofunctional units (M' and M") as defined by Formula VII; and (4) when the sum $t+u+v+w$ is one, the copolymers also have different endblocking units, that is, a combination of M and M' or M".

When the cyano-substituted ether group $[-(O)_q$-R'OR"-CN, also expressed herein as $-(O)_qC_cH_{2c}OC_dH_{2d}$-CN] of the Y and/or M" units of the polymers of this invention is bonded to silicon by an Si-C bond, that is, when $q$ is zero, the polymers may also be prepared by the method which comprises the platinum-catalyzed addition of polyalkylsiloxane hydrides or polyether-substituted polyalkylsiloxane hydrides to monoolefinic cyanoalkyl ethers having the formula, $C_cH_{2c-1}OC_dH_{2d}CN$, where $c$, as previously defined has a value from 3 to 8, and $d$ has a value from 2 to 4. For example, in accordance with one embodiment of this method, referred to herein as Method D, the hydrosilation of the monoolefinic cyanoalkyl ether is carried out concurrently with hydrosilation of monoolefinically endblocked polyether reactants as illustrated by the following equation 3 in which the Si-H reactant is that encompassed by above Formula III.

Equation 3

$R_3SiO[R_2SiO]_x[RSiO]_{u+z}SiR_3 + y C_cH_{2c-1}OC_dH_{2d}CN$
$\quad |$
$\quad H$

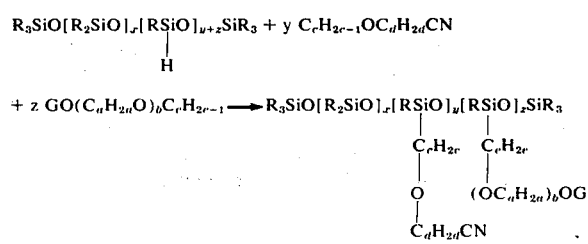

It is to be understood that the reaction of Equation 3 may also be carried out by first hydrosilating $z$ moles of the polyether reactant to provide an intermediate having the average composition,

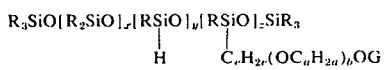

which is then reacted with $y$ moles of the monoolefinic cyanoalkyl ether to provide the product shown in Equation 3.

In accordance with still another embodiment of Method C, the polyalkylsiloxane hydride fluid shown in Equation 3 is reacted initially with $y$ moles of the monoolefinic cyanoalkyl ether followed by reaction of the intermediate cyanoalkoxyalkyl-modified polyalkylsiloxane hydride with $z$ moles of either the monoolefinically unsaturated polyether reactant shown in Equation 1 or the hydroxylterminated polyether reactant shown in Equation 2. This sequence of reactants is illustrated by Equations 3a–3c wherein allyl 2-cyanoethyl ether is shown as the cyanobearing reactant:

Equation 3a $$R_3SiO[R_2SiO]_x[RSiO]_{y+z}SiR_3 + y\ CH_2=CHCH_2OCH_2CH_2CN$$

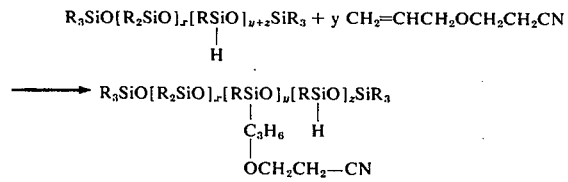

Equation 3b

Product of Equation 3a + $z\ GO(C_nH_{2n}O)_bC_cH_{2c-1}$

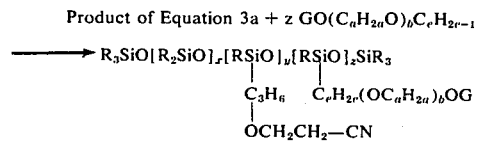

Equation 3c

Product of Equation 3a + $z\ G(OC_nH_{2n})_b$—OH

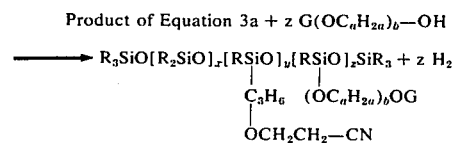

wherein R, G, $a$, $b$, $e$, $x$, $y$ and $z$ are as previously defined. When R is methyl and the polyether reactants are $Go(C_2H_4O)_bCH_2CH=CH_2$ and $GO(C_2H_4O)_b$-H, the polymer products of Equations 3b and 3c have the average compositions shown hereinabove by formulas VIII and IX, respectively.

When the cyano-substituted ether groups, —$(O)_q$-R'OR''—CN, of the siloxane-polyoxyalkylene block copolymers of this invention are bonded to silicon by Si-O-C linkages, that is, when $q$ is one, the polymers are prepared by the method which comprises hydrogen condensation of Si-H and HO-C groups derived respectively from polyalkylsiloxane hydrides and hydroxyalkyl cyanoalkyl ethers having the formula, HO-$C_cH_{2c}$-O-$C_dH_{2d}$-CN wherein the value of $c$, as previously defined, is from 3 to 8, and the value of $d$ is from 2 to 4. In accordance with one embodiment of this method, referred to herein as Method D, the condensation reaction is carried out simultaneously with hydrogen condensation of Si-H of the polyalkylsiloxane hydride and HO-C of hydroxyl-terminated polyether reactants, as shown by the following equation 4 in which the Si-H reactant is also that encompassed by Formula III.

Equation 4

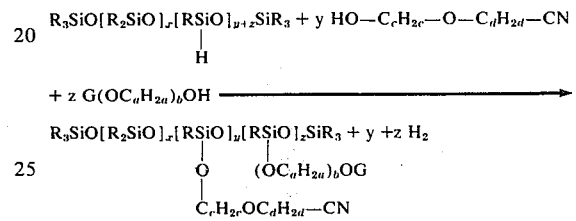

wherein R, G, $a$, $b$, $c$, $d$, $x$, $y$ and $z$ have the above defined significance. It is to be understood that the reaction of Equation 4 may also be carried out by first reacting $z$ moles of the polyether reactant with the polyalkylsiloxane hydride to provide an intermediate having the average structure.

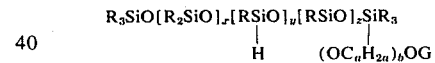

which is then reacted with $y$ moles of the hydroxyalkyl cyanoalkyl ether to provide the polymer product shown in Equation 4. In accordance with another embodiment of Method D, the polyalkylsiloxane hydride fluid is partially reacted initially with $y$ moles of the cyanobearing ether reactant followed by reaction of the intermediate cyanoalkoxyalkoxy-modified Si-H fluid with $z$ moles of either the monoolefinically unsaturated polyether reactant shown in Equation 1 or the hydroxyl-terminated polyether reactant shown in Equation 2. This sequence of reactions is illustrated by the following Equations 4a–4c:

Equation 4a

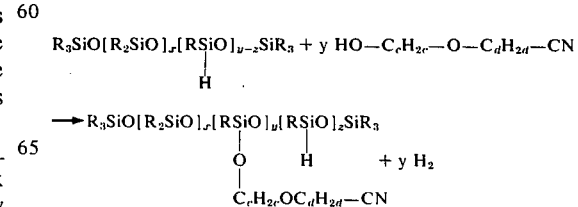

Equation 4b:

Product of Equation 4a + z GO($C_nH_{2n}O)_bC_rH_{2r-1}$

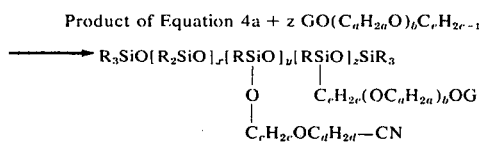

Equation 4c:

Product of Equation 4a + z G(OC$_nH_{2n})_b$—OH

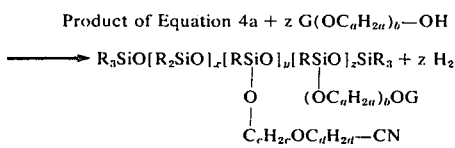

wherein R, G, a, b, c, d, e, x, y and z are as previously defined. When R is methyl, and the cyano-bearing ether reactant is 3-hydroxypropyl 2-cyanoethyl ether (and thus c is three and d is two), and the polyether reactants are Go($C_2H_4O)_b$CH$_2$CH=CH$_2$ and GO($C_2H_4O)_b$-H, the polymer products of Equations 4b and 4c have the compositions shown hereinabove by Formulas X and XI, respectively.

The hydrosilation reactions illustrated by Equations 1, 1a, 3, 3a, 3b and 4b, which overall comprise the addition of Si-H to the respective monoolefinic groups of the polyether and cyano-substituted monoether reactants, are effected in the presence of a platinum catalyst. Particularly effective is platinum in the form of chloroplatinic acid dissolved, if desired, in a solvent such as tetrahydrofuran, ethanol, butanol or mixed solvents such as ethanol-ethylene glycol dimethyl ether. It is to be understood, however, that other platinum derivatives known to the art as hydrosiliation catalysts may also be used, such as those prepared in accordance with U.S. Pat. No. 3,220,972. The platinum is present in a catalytic amount such as, for example, from about 5 to about 400 parts by weight per million (p.p.m.) parts of the combined weight of the silicon-containing and organic reactants. The more usual platinum concentration is from about 25 to about 300 p.p.m. Suitable reaction temperatures range from about room temperature (20°C.) to about 200°C., and are more usually from about 60°C. to about 160°C.

The condensation reactions illustrated by Equations 2, 2a, 3c, 4, 4a and 4c which overall comprise the reaction of silanic hydrogen (Si-H) and hydrogen of the -OH groups of the hydroxyl-terminated polyether reactant and the hydroxyalkyl cyanoalkyl ether reactant, are promoted by a variety of catalysts such as organic derivatives of tin, platinum and other transition metals. Especially suitable are organic derivatives of tin such as tin carboxylates which are typically illustrated by stannous octoate, stannous oleate, stannous laurate and dibutyl tin dilaurate. These catalysts are employed in amounts from about 0.1 to about 5, and usually no more than about 2, weight percent, based on the total weight of the reactants. The Si-H/HO-C condensation reactions are effected at temperatures from about 60°C. to about 150°C., and more usually from about 80°C. to about 120°C.

The various reactions of Equations 1 through 4c are usually carried out employing the organic reactants (that is, the polyether and cyano-substituted ether) in amounts at least sufficient to react with a predetermined proportion of the silicon-bonded hydrogen of the Si-H reactant. From the standpoint of more effective and more complete reaction of silanic hydrogen, the organic reactants are usually employed in excess of stoichiometric requirements. In those reactions (equations 1, 1a, 2, 2a, 3b, 3c, 4b and 4c) wherein the Si-H groups are to be completely reacted with only one of the organic reactants to form the desired final polymer, the organic reactant may be employed in amounts up to a 100 or more mole percent excess. In the case of the polyether reactant, however, usually no more than about a 50 mole percent excess is used. On the other hand, when the Si-H reactant is either partially reacted initially with one of the organic reactants as shown, for example, by equations 3a and 4a, or is reacted with the polyether and cyano-substituted ether reactants concurrently as shown by equations 3 and 4, the organic reactants are employed in an amount just sufficient to satisfy the predetermined stoichiometric requirements of the desired reaction or only a small excess such as up to about 50 (e.g., 20 to 30) mole percent is used. With respect to the hydrosilation reactions of equations 3 and 3a it is usually desirable to employ the monoolefinic cyanoalkyl ether in excess of the desired stoichiometric reaction in view of the tendency of such reactants to undergo isomerization and reduction. For example, the allyl 2-cyanoethyl ether reactant shown in equation 3a can undergo isomerization and reduction in the presence of Si-H and platinum catalyst to form the respective by-products, $CH_3CH$=CHOCH$_2$CH$_2$CN and CH$_3$CH$_2$CH$_2$OCH$_2$CH$_2$CN.

The hydrosilation and condensation reactions may be conducted in the absence or presence of a solvent. Illustrative solvents are any of the following employed individually or in combination with one another: the normally liquid aromatic hydrocarbons such as benzene, toluene and xylene; alcohols such as n-propanol and isopropanol; ether; ether alcohols; and other such non polar or polar solvents. Upon completion of the respective hydrosilation and condensation reactions, any unreacted monoolefinic cyanoalkyl ether (including by-products derived therefrom) or hydroxyalkyl cyanoalkyl ether, or any organic solvent employed in the polymer preparation, may be removed by conventional separation techniques to obtain the final product comprising the polymer compositions of the invention. It is to be understood, however, that some portion or all of the solvent and excess reactants including by-products thereof and the polyether reactant may remain in the product and that such diluted polymer compositions are within the scope and may be used in accordance with the teachings of this invention. In the hydrosilation reactions, the removal or neutralization of the chloroplatinic acid catalyst is usually desirable for long range product stability. Neutralization is readily effected by adding sodium bicarbonate to the reaction mixture followed by filtration of the resultant slurry to remove the neutralizing agent and platinum residues.

The Q-modified polyalkylsiloxane hydrides encompassed by Formulas II and II-A and employed in the reactions of equations 1, 1a, 2, 2a, 3b, 3c, 4b and 4c, are in turn provided by any one of a number of methods. Overall, the methods employed in providing such cyano-substituted Si-H compositions comprise the use of various combinations of the precursor reactants described below as the source of the indicated siloxy units or Q groups.

a. Hexaalkyldisiloxanes, $R_3SiOSiR_3$, when the endblocking units are $R_3SiO_{1/2}$, that is, when $t$, $u$, $v$ and $w$ of Formulas II and II-A are zero.

b. Di[cyanoalkoxyalkyl]tetraalkyldisiloxanes, (NC-R''OR')(R)$_2$SiOSi(R)$_2$(R'OR''-CN), when the endblocking units are (NC-R''OR')(R)$_2$SiO$_{1/2}$, that is, when $t$ and $w$ of Formulas II and II-A are both one. Such reactants in turn are prepared by hydrolysis of (NC-R''OR')(R)$_2$SiX° where X° is chlorine or bromine, employing one mole of water for every two moles of halide.

c. Dihydrogentetraalkyldisiloxanes, (H)(R)$_2$Si-OSi(R)$_2$(H), when the endblocking units are (H)(R)$_2$SiO$_{1/2}$, that is, when $u$ and $v$ of Formulas II and II-A are both one.

d. Cyclic dialkylsiloxane polymers, $[R_2SiO]_h$, where $h$ usually has an average value of from about 3 to about 6, as the source of the difunctional dialkylsiloxy units (X), $R_2SiO_{2/2}$, when such X units are to be incorporated, that is, when $x$ of Formulas II and II-A is a positive number.

e. Trialkyl-endblocked dialkylsiloxane polymers, $R_3SiO(R_2SiO)_rSiR_3$, where $r$ has an average value of at least two and is usually no more than about 10, as the source of the endblocking units, $R_3SiO_{1/2}$, and as a source of the dialkylsiloxy units (X), $R_2SiO_{2/2}$, when the latter units are to be incorporated.

f. Cyanoalkoxyalkyl-alkylsiloxane polymers as the source of the

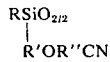

units encompassed by Y where, as previously defined, R' is the bivalent alkylene radical, —$C_cH_{2c}$—, $c$ having a value from 3 to 8 and R'' is bivalent alkylene, —$C_dH_{2d}$—, $d$ having a value from 2 to 4. These polymers are formed by the hydrolysis of cyanoalkoxyalkyldichlorosilanes, NC-R''OR'-Si(R)Cl$_2$, followed by the base-catalyzed dehydration-cyclization of the hydrolyzate to form cyclics having the formula, [NC-R''OR'-Si(R)O]$_w$, the average value of $w$ being 3 or more.

g. Cyanoalkoxyalkylheptaalkylcyclotetrasiloxanes, [(NC-R''OR')(R)SiO][(R)$_2$SiO]$_3$, as the source of both the X units and the (NC-R''OR')(R)SiO$_{2/2}$ units encompassed by Y. Such cyclics are in turn provided by the platinum-catalyzed hydrosilation reaction between hydrogenheptaalkylcyclotetrasiloxanes, [(H)(R)SiO][(R)$_2$SiO]$_3$, and the monoolefinic cyanoalkyl ethers defined hereinbelow as reactant (i).

h. Polymeric alkylsiloxane hydride fluids having an Si-H content sufficient to provide from about 200 to about 372 cubic centimeters of hydrogen per gram, as the source of

that is, the Z° units of Formula II.

i. Monoolefinic cyanoalkyl ethers, $C_cH_{2c-1}OC_dH_{2d}CN$, wherein $c$ is from 3 to 8 and $d$ is from 2 to 4 as the source of NC-R''OR'- of the NC-R''OR'-Si(R)O$_{2/2}$ units encompassed by Y, wherein R' and R'' are more particularly shown as the bivalent alkylene radicals, —$C_cH_{2c}$— and —$C_dH_{2d}$—, respectively.

j. Hydroxyalkyl cyanoalkyl ethers, NC-R''OR'-OH, as the source of the NC-R''OR'—O— groups of the NC-R''OR'O-Si(R)O$_{2/2}$ units encompassed by Y, wherein R' and R'' are also more particularly expressed as the above defined bivalent alkylene radicals, —$C_cH_{2c}$— and —$C_dH_{2d}$—, respectively.

From Formulas II and II-A it is evident that, when each of $t$, $u$, $v$ and $w$ is zero and Y has the unit formula, (NC-R''OR')(R)SiO$_{2/2}$, the cyano-substituted Si-H fluids have the average composition expressed by the following Formula II-B wherein R' and R'' are expressed as —$C_cH_{2c}$— and —$C_dH_{2d}$—, respectively:

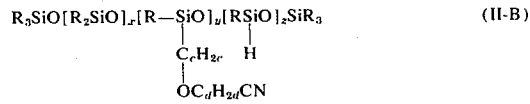

wherein: R as previously defined is alkyl having one to ten carbon atoms and is preferably lower alkyl; $c$ has a value of 3 to 8; $d$ has a value of 2 to 4; $x$ is zero or any positive number having an average value up to about 20; $y$ has an average value from about 2 to about 20; and $z$ has an average value from about 2 to about 30. The compositions encompassed by Formula II-B are suitably employed to provide copolymers of the invention as illustrated by equations 3b and 3c hereinabove.

One method for preparing the compositions encompassed by Formula II-B comprises equilibration of various combinations of reactants (a) and (d)-(h). Illustrative is the reaction of the following equation 5 which comprises equilibration of reactants (a), (d), (f) and (h), and in which polymeric reactants (d), (f) and (h) are shown, for convenience, simply as the siloxy units which they provide to the equilibrated reaction product.

Equation 5

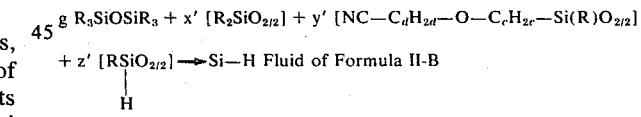

In the above equation 5 and other equations hereinbelow, g represents the actual number of moles of the indicated reactant, and $x'$, $y'$ and $z'$ represent the actual number of moles (or mole-equivalents) of the indicated monomeric units provided by the polymeric source of such units. It is to be understood, therefore, that $g$, $y'$ and $z'$, and when X units are present, $x'$, can be any positive numbers depending upon the scale on which the reactions are run, provided that when normalized on the basis of $g=1$ (or two moles of monofunctional units), the average value of the mole ratio $x':y':z'$ is 0–20:2–20:2–30, respectively, thereby providing Si-H fluids wherein the ratio $x:y:z$ has a corresponding average value of 0–20:2–20:2–30, as previously defined.

It is to be understood that in providing the cyanoalkoxyalkyl-modified polyalkylsiloxane hydrides encompassed by Formula II-B in which no X units are present (that is, when $x$ is zero), the reaction of equation 5 is effected in the absence of reactant (d) whereas when $x$ is a positive number, reactant (d) is employed. In addition to the reaction of equation 5, the Si-H fluids encompassed by Formula II-B wherein $x$ is a positive number, may also be prepared by equilibration of reactants (e), (d), (f) and (h) as illustrated by equation 6 below, or by the equilibration of reactants (a), (g) and (h), as illustrated by equation 7.

Equation 6

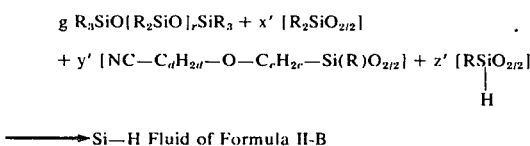

⟶ Si—H Fluid of Formula II-B

Equation 7

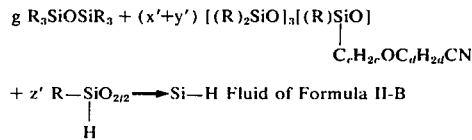

In the cyanoalkoxyalkyl-modified polyalkylsiloxane hydrides produced by the reaction of equation 6, the average number of the $R_2SiO_{2/2}$ units, that is, the value of $x$, corresponds to the value of $[x'+(g \times r)]$, normalized on the basis of $g=1$. In the cyanoalkoxyalkylmodified polyalkylsiloxane hydrides produced by the reaction of equation 7, the ratio of $x{:}y$ will of course be 3:1, corresponding to the ratio of the X and Y units present in reactant (g). The ratio of $x{:}y$ may be adjusted to above or below 3:1, as desired, by effecting the reaction of equation 7 in the presence of reactant (d) as an additional source of the X units, thereby increasing the ratio above three, or by the employment of an appropriate proportion of reactant (f) as an additional source of the Y units, $(NC-R''OR')(R)SiO_{2/2}$, thereby decreasing the ratio to less than three.

With further reference to general Formulas II and II-A, it is evident that when $t$ and $w$ are both one and Q is cyanoalkoxyalkyl, the Si-H fluids have the average composition depicted by the following Formula II-C in which the cyanoalkoxyalkyl groups are expressed as $NC-C_dH_{2d}\text{-}O\text{-}C_cH_{2c}-$.

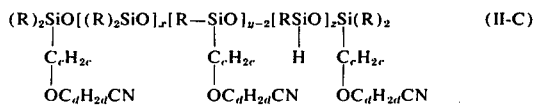

wherein R, c, d, x, y and z are as previously defined such as is summarized with specific reference to Formula II-B. Such compositions are employed to provide the cyanoalkoxyalkyl-substituted polysiloxane-polyoxyalkylene copolymers within the scope of Formula V-A (wherein $q$ is zero) by application of the reactions of equations 1 and 2 above. The Si-H compositions defined by Formula II-C are in turn provided by effecting the equilibration reactions of equations 5–7 in the presence of reactant (b) instead of reactants (a) and/or (e), as illustrated by the following modification of equation 5.

Equation 8:

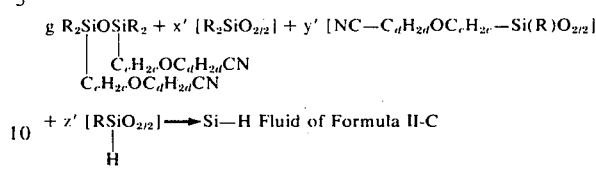

When $y$ of Formula II-C is two, it is evident that the cyanoalkoxyalkyl groups are present solely in the end-blocking monofunctional units (M'') and that such compositions are provided by effecting the reaction of equation 8 in the absence of the cyclic source of the Y units, that is, in the absence of reactant (f).

With further reference to general Formulas II and II-A, it is evident that when $u$ and $v$ are both one and Q is cyanoalkoxyakyl, the Si-H fluids have the average composition depicted by the following Formula II-D in which the cyanoalkoxyalkyl groups are expressed as $NC\text{-}C_dH_{2d}\text{-}O\text{-}C_cH_{2c}-$.

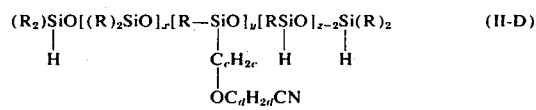

wherein R, c, d, x, y and z are also as summarized with specific reference to Formula II-B. Such compositions are employed, for example, to provide the cyanoalkoxyalkyl-substituted polysiloxane-polyoxyalkylene copolymers within the scope of Formula VI-A by application of the reactions of equations 1 and 2. The Si-H compositions defined by Formula II-D are in turn provided by effecting the equilibration reactions of equations 5–7 in the presence of reactant (c) instead of reactants (a) and/or (e), as illustrated by the following modification of equation 5.

Equation 9

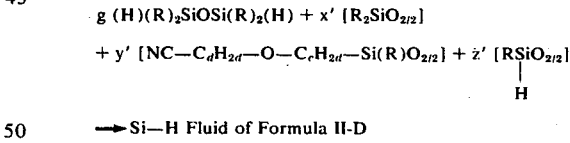

⟶ Si—H Fluid of Formula II-D

In the copolymers encompassed by Formula VI-A in which $z$ is two, the Si-H reactants employed to provide such copolymers will contain no Z° units $[(H)(R)SiO_{2/2}]$ and are prepared by effecting the reaction of equation 9 in the absence of reactant (h).

In providing the Si-H fluids by the one-step reactions of equations 5 to 9, standard base-catalyzed equilibration reaction conditions are not suitable in view of the base-sensitivity of the Si-H groups. Therefore, the equilibration reactions of equations 5 to 9 are promoted by acid catalysts. Suitable catalysts for this purpose are trifluoromethylsulfonic acid ($CF_3SO_3H$) and concentrated (93–98 weight percent) sulfuric acid. The catalyst is usually employed in a concentration of from about 0.1 to about four weight percent, based on the total weight of reactants. The acid-catalyzed equilibration reactions are usually carried out with vigorous mechanical stirring at temperatures within the range from about 20°C. to about 120°C. at least until the reaction mixture becomes homogeneous. Effecting the reaction at temperatures from about 20° to about 50°C. usually provides a satisfactory rate of reaction. After completion of the reaction, the reaction product is neutralized with base such as sodium bicarbonate and filtered, sometimes adding a liquid hydrocarbon such as xylene or toluene or a filter aid to facilitate the filtration. When a diluent is used, it is conveniently separated from the reaction product by rotary vacuum evaporation.

In addition to the one-step reactions of equations 5 to 9, the cyanoalkoxyalkyl-polyalkylsiloxane hydrides encompassed by general Formulas II and II-A may also be prepared in step-wise manner. For example, the overall reaction of equation 5 may be effected by the following sequence of reactions:

Equation 5a

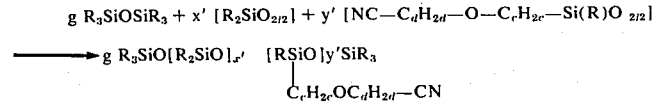

Equation 5b

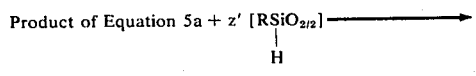

Si—H Fluid of Formula II-B

In view of the fact that the Si-H reactant is not used in the reaction of equation 5a, it may be effected in the presence of conventional alkaline equilibration catalysts useful in the preparation of unmodified polyalkylsiloxanes. Illustrative of such alkaline catalysts are potassium silanolate, cesium hydroxide and tetramethyl ammonium silanolate. Such promoters are usually employed in concentrations of from about 30 to about 50 p.p.m., based on the total weight of reactants. The temperature at which the base-catalyzed equilibration reaction of equation 5a is carried out depends largely on the catalyst employed. Thus, when tetramethyl ammonium silanolate is used, suitable reaction temperatures are from about 75°C. to about 100°C., preferably from about 80°-90°C. The other alkaline catalysts usually require higher temperatures such as at least about 150°C. to about 200°C. The further reaction of the product of equation 5a to introduce the

units, as shown by equation 5b, is carried out in the presence of an acid equilibration catalyst as described with specific reference to the reactions of equations 5 to 9.

A third route to the cyanoalkoxyalkyl-polyalkyl-siloxane hydrides encompassed by Formula II-B comprises the use of the monoolefinic cyanoalkyl ethers described above as reactant (i), as the source of the cyanoalkoxyalkyl groups, as illustrated by the following sequence of reactions wherein allyl 2-cyanoethyl ether is shown as the cyanobearing ether reactant:

Equation 10a

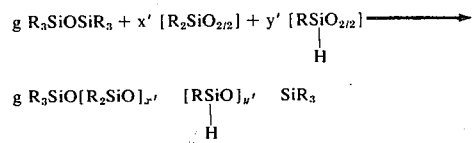

Equation 10b

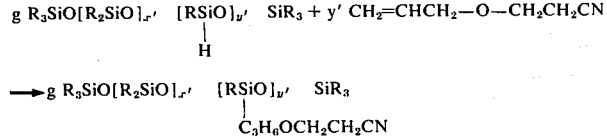

Equation 10c

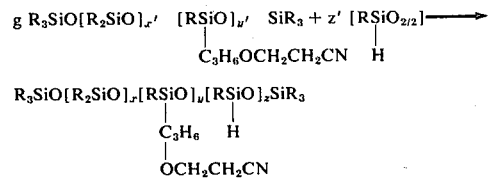

The reaction of equation 10a is effected in the presence of acid equilibration catalysts such as trifluoromethylsulfonic acid and sulfuric acid, at temperatures usually from 20°C. to about 50°C. The reaction of equation 10b is platinumcatalyzed and is effected under the conditions described with specific reference to the hydrosilation reactions shown, for example, by equation 1. The reaction of equation 10c is acid-catalyzed and is carried out under the conditions described with reference to equations 5 to 9, employing an acid equilibration catalyst. Prior to the further reaction of the intermediate fluid provided by equation 10b, however, it is desirable to separate any unreacted allyl cyanoalkyl ether or isomerized derivatives thereof, in order to minimize any tendency of such compounds to react with the acid catalyst employed in the reaction of equation 10c. It is to be understood that, instead of introducing the

units in two stages (equations 10a and 10c), such units may be introduced during the reaction of equation 10a in a predetermined amount sufficient to provide the total desired amount ($y'+z'$) followed by partial reaction of the Si-H groups with $y'$ moles of the monoolefinic cyanoalkyl ether reactant. This latter embodiment is illustrated by the hydrosilation reaction of equation 3a above.

With further reference to general Formulas II and II-A, it is evident that when $t$ through $w$ are zero and Q is cyanoalkoxyalkoxy, the Si-H fluids have the average composition depicted by the following Formula II-E,

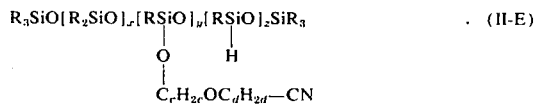

(II-E)

wherein R, $c$, $d$, $x$, $y$ and $z$ are also as summarized with specific reference to Formula II-B. Such Si-H fluids are prepared by methods which comprise the condensation of silanic hydrogen and hydrogen of the HO-C groups of the hydroxyalkyl cyanoalkyl ethers, HO-$C_cH_{2c}$-O-$C_dH_{2d}$-CN, described above as reactant (j), as the source of the cyanoalkoxyalkoxy groups. One such method is as illustrated by the reaction of equation 4a, which as previously described herein, is usually promoted by catalysts comprising tin such as stannous octoate. By way of specific illustration, cyanoethoxypropoxysubstituted polymethylsiloxane hydrides having the average composition:

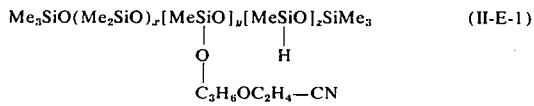

(II-E-1)

are provided by the reaction of the following equation 11, employing 3-hydroxypropyl 2-cyanoethyl ether as the source of the 3-(2-cyanoethoxy)propoxy groups:

Equation 11

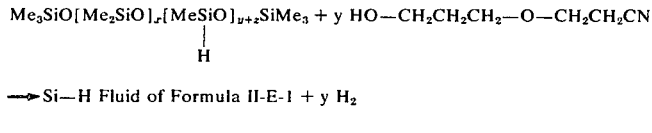

The reaction of equation 11 is carried out in the presence of the metal catalysts, preferably tin carboxylates such as stannous octoate, as described, for example, with specific reference to the reaction of equation 2.

The Si-H fluids having Formula II-E-1 are useful in providing the polysiloxane-polyoxyalkylene block copolymers encompassed by formulas X and XI by the hydrosilation and hydrogen condensation reactions of equations 1 and 2, respectively, employing as the polyether reactants the above-described monoolefinically end-blocked or hydroxylterminated polyoxyethylene ethers, $GO(C_2H_4O)_bCH_2$-CH=$CH_2$ and $GO$-$(C_2H_4O)_b$-H, respectively.

The cyanoalkoxyalkyl- and cyanoalkoxyalkoxysubstituted polyalkylsiloxane hydrides having the average composition expressed by Formula II (including Formulas II-A through II-E) are described and claimed in our copending application Ser. No. 536,874, filed concurrently herewith, entitled "Cyano-Ether Polyalkylsiloxane Hydrides," now U.S. Pat. No. 3,943,156, granted Mar. 9, 1976.

The cyano-substituted siloxane-polyoxyalkylene copolymers encompassed by Formula I are normally liquid compositions and, as previously described, comprise mixtures of polymer species which differ in molecular weight, polyether and siloxane contents and relative number of monomeric units. Generally, the average molecular weight of the block copolymers ranges from about 800 to about 50,000 (as measured by Gel Permeation Chromatography using a calibration curve based on dimethylsiloxane fluids). It is to be understood that two or more block copolymers which have a particular average composition encompassed by Formula I may be admixed in suitable relative proportions to adjust the average values of $x$, $y$ and $z$, as desired. For example, a copolymer wherein $y$ has an average value of about 5 may be admixed with about an equimolar proportion of another composition wherein $y$ has an average value of about 2 to provide a copolymer wherein $y$ has an average value of about 3.5. Similarly, respective Si-H fluids encompassed by Formulas II and III in which no $R_2SiO_{2/2}$ units are present (that is, in which $x$ is zero), may be admixed in any relative proportion with a corresponding Si-H fluid in which $x$ is one, thereby providing a product in which the average value of $x$ is less than one (such as, for example, 0.1, 0.5, etc.) which is then reacted as described herein to provide copolymers of the invention in which $x$ has a corresponding average value. It is also to be understood that a small percentage (on the average, usually about 15 mole percent or less) of the polyoxyalkylene blocks of the copolymers of the invention may comprise residual, uncapped hydroxyl-terminated groups introduced with the polyoxyalkylene ether reactants.

The novel cyanoalkoxyalkyl- and/or cyanoalkoxyalkoxy-substituted siloxane-polyoxyalkylene copolymers of this invention are effective as stabilizers of flexible polyester urethane foams and can, therefore, be used as such without the need for combination with an anionic or cationic organic surfactant, or other type of organic additive. The polymers can be employed as a 100 percent active stream, or they can be employed in dilute form as a solution in polar solvents (e.g., glycols) or non polar organic solvents such as normally liquid aliphatic and aromatic unsubstituted and halogen-substituted hydrocarbons (e.g., heptane, xylene, toluene, chlorobenzenes and the like). In addition to the copolymers, the other essential types of components and reactants employed in the production of flexible polyester urethane foam in accordance with the process of this invention are polyester polyols, organic polyisocyanates, amine catalyst and blowing agent. When producing flame-retarded foams, the foam-producing reaction mixture also contains a flame-retardant. The amount of organosilicone polymers of this invention present in the final foam-producing reaction mixture may vary over a relatively wide range such as from about 0.15 to about 4.0 parts by weight per 100 parts by weight of the polyester polyol reactant, and is usually at least 0.3 and no more than about 2 parts.

It is to be understood that the cyano-bearing siloxane-polyoxalkylene copolymers of the invention can be used in combination with other types of silicon-containing surfactants. For example, the copolymers described herein may be in combination with block copolymers in which the backbone of the siloxane blocks is substituted only with silicon-bonded methyl or other alkyl groups such as the copolymers described in the aforementioned U.S. Pat. No. 3,594,334, as exemplified by the copolymer component of Surfactant AA described in greater detail in the examples. Other organosilicones which can be used in combination with the surfactants of this invention are those containing monofunctional trialkylsiloxy units (e.g., $Me_3SiO_{1/2}$) in combination with tetrafunctional siloxy units (i.e., $SiO_{4/2}$) and polyfunctional siloxy units bearing a polyoxyalkylene group (e.g., $Me(E)SiO_{2/2}$) in the relative proportions described in U.S Pat. No. 3,793,360. Of the class of stabilizers described in the latter patent, those having the following average formula are especially preferred for use in combination with the copolymers of the present invention:

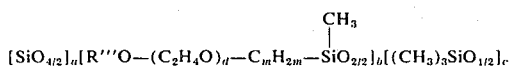

wherein: $d$ has an average value of from 5 to about 15; $m$ has a value from 2 to 4; the mole ratio $a:b:c$ has an average value of 0.4–2:1:0.2–2, and $R'''$ is phenyl, lower alkyl such as methyl, lower alkaryl or aryl-substituted lower alkyl groups such as benzyl. When used, the additional organosilicone is used in a minor amount which is usually from about 1 to about 30 parts by weight per 100 parts by weight of the copolymers of this invention.

It is often the preferred practice of foam manufacturers to premix the foam stabilizer, amine catalyst and water (which is the usual source of at least part of the blowing action), and to feed the aqueous premixture to the foam-producing reaction mixture as a single stream. The mere mixing of the cyano-substituted siloxane-polyoxyalkylene copolymers of this invention with the catalyst and water, however, forms a heterogeneous mixture which detracts from the processing advantage of adding these components as a combined stream rather than as individual streams. The problem of premix incompatibility is overcome by providing homogeneous aqueous premixtures comprising the cyano-substituted siloxane-polyoxyalkylene copolymers of the present invention, an amine catalyst, an organic acidic component and, as an additional ingredient, either a water soluble organic surfactant or a water soluble glycol, or both of the latter two types of components. Although these various organic additives can be introduced directly to the aqueous premixture of foam stabilizer and catalyst, the formation of clear, homogeneous aqueous solutions is facilitated by blending the additives with the foam stabilizer (that is, the organosilicone polymers of this invention) and combining the resulting blend with water and the amine catalyst system. In accordance with another embodiment of this invention, therefore, solution compositions are provided comprising the cyanoalkoxyalkyl- and/or cyanoalkoxyalkoxy-substituted siloxane-polyoxyalkylene copolymers described herein, the aforesaid organic acidic component, and one or both of an organic surfactant and glycol. The said copolymers are present in the solution compositions in an amount of from about 10 to about 80 parts by weight per 100 parts by weight of the solution.

The aforesaid organic acidic component comprises the saturated and unsaturated aliphatic and cycloaliphatic carboxylic acids containing from 15 to 20 carbon atoms. Illustrative of suitable acidic components are the fatty acids such as, for example, palmitic, stearic, palmitoleic, oleic, linoleic, linolenic and ricinoleic acids, resin acids of the abietic and pimaric type; and any combination of the aforesaid acids as well as industrial by-products and naturally-occurring materials comprising such acids. An especially suitable acidic component of the solution compositions and aqueous premixtures of this invention is tall oil which is a by-product of sulfate digestion of wood pulp and is composed largely of fatty acids (oleic, linoleic, linolenic and palmitic acids) and resin acids, and a minor amount of neutral material such as fatty acid esters.

The above-described organic acidic component is present in the solution compositions of this invention in an amount of from about 5 to about 90 parts by weight per 100 parts by weight of organosilicone polymer present in the solution.

The water-soluble organic surfactant which can be a component of the solution compositions of this invention may be of the non ionic, anionic, cationic or amphoteric types, including combinations thereof. Illustrative of the non ionic types of organic surfactants which can be employed are: the poly(oxyalkylene) ethers of the higher alcohols having from 10 to 18 carbon atoms including mixtures thereof; polyoxyalkylene ethers of alkyl-substituted phenols in which the alkyl group can have from 6 to 15 carbon atoms; and corresponding polythioalkylene adducts of the aforesaid higher alcohols and phenols. The length of the ether chain is such that appropriate hydrophilic character is provided to balance the hydrophobic portion derived from the alcohol or phenol and render the compound soluble in water. The chain may contain oxyethylene units either as essentially the sole type of unit or oxyethylene in combination with a minor amount of oxypropylene. It is preferred that the hydrophilic portion of the non ionic surfactants be composed essentially of oxyethylene monomeric units. Usually the average number of such —$OC_2H_4$— units ranges from about 4 to about 20, although upwards of 40 such units can also be present.

Typical examples of non ionic surfactants which can be used as components of the solution compositions of this invention are the adducts produced by reaction of $k$ moles of ethylene oxide (wherein $k$ has a value of from about 4 to about 40, inclusive of whole and fractional numbers) per mole of any of the following hydrophobes including mixtures thereof: n-undecyl alcohol, myristyl alcohol, lauryl alcohol, trimethyl nonanol, tridecyl alcohol, pentadecyl alcohol, cetyl alcohol, oleyl alcohol, stearyl alcohol, nonylphenol, dodecylphenol, tetradecylphenol, and the like.

Other illustrative water soluble organic surfactants which can be present as a component of the solution compositions of this invention are the liquid, anionic organic surfactants having at least one carbon-bonded sulfonic acid group, —$SO_3H$, or an ammonium, quaternary ammonium, alkali metal or alkaline earth metal derivative of said sulfonic acid group. The sulfonic acid groups or salt derivatives thereof can be substituents on a wide variety of "backbone" organic compounds which provide the hydrophobic portion of the emulsifier. The hydrophobic portion may consist of carbon and hydrogen as in sulfonated hydrocarbons (or salt derivatives thereof) having from 10 to 25 or more carbon atoms such as alkanes, high (e.g., $C_{10}$-$C_{15}$) alkyl-substituted benzenes, and liquid petroleum fractions, as typically illustrated by sodium tetradecyl sulfonate, sodium dodecylbenzene sulfonate and sodium and potassium salts of sulfonated mineral oil. The —$SO_3H$ group or salt derivative thereof may also be a substituent on an organic backbone consisting of carbon, hydrogen and oxygen wherein oxygen is present in an ether linkage as in polyoxyalkylene groups or in a carboxylic acid ester group. Typical of such compounds are those obtained by sulfating or sulfonating oxyalkylated fatty acid esters wherein the oxyalkylation is usually effected with ethylene oxide, propylene oxide or a combination thereof. Other examples of suitable organic surfactants for use in combination with the silicon-containing foam stabilizers of the present invention are: the products obtained by reaction of amines such as diethylamine with long chain fatty acids such as oleic acid or with sulfonated $C_{10}$-$C_{15}$ alkylated aromatic hydrocarbons; taurine compounds having at least one long chain hydrocarbyl group bonded to nitrogen; and the like.

The solution compositions of this invention may also contain, as a third type of organic component, a glycol of from 2 to about 10 carbon atoms, or low molecular weight polyethylene glycols such as, for example, CARBOWAX 400 which is a polyethylene glycol having a formula molecular weight range of 380–420. Especially suitable is hexylene glycol (2-methyl-2,4-pentanediol).

When both the organic surfactant and glycol components are present in the solution compositions of this invention, the combined concentration thereof ranges from about 5 to about 90 parts by weight per 100 parts by weight of the organosilicone polymer contained therein. When only one of these components is present, the concentration thereof is also within this latter range.

When the aforesaid solution compositions of the organosilicone polymers of this invention are combined with water and amine catalyst such as the catalysts described hereinbelow, clear homogeneous aqueous solutions are obtained which can be added directly to the foam-producing reaction mixture. From the standpoint of retaining these desirable characteristics of clarity and homogeneity under otherwise adverse ambient temperatures which may be encountered upon standing, storage or shipment prior to use in the foam-producing reaction, the preferred aqueous premixtures are those containing both the organic surfactant and the glycol, in addition to the organic acidic component. It is to be understood that the solution compositions are also useful when added directly to the final foam-producing reaction mixture rather than being premixed with water and amine catalyst.

The solution compositions of the foam stabilizer as well as the aqueous premixtures of this invention, can contain minor amounts of other ingredients without departing from the scope of this invention. Such components include inhibitors such as for example, d-tartaric acid, tertiary-butyl pyrocatechol and di-tert-butyl-p-cresol ("Ionol"), which reduce any tendency of the foamed product to oxidative or hydrolytic instability. Further, when the foam stabilizers of this invention and/or the amine catalyst are employed as respective solutions, water soluble carrier solvents and components thereof are, of course, introduced into the aqueous premixtures without, however, any deleterious affect on the effectiveness or homogeneity of the aqueous premixtures.

The relative proportions of the organosilicone foam stabilizer of this invention, the amine catalyst and water in any particular solution are largely dependent upon and determined by the relative proportions of such ingredients which are desired in a particular foam-producing reaction mixture. Accordingly, in the preparation of a particular aqueous premixture of this invention, the relative proportions of the foam stabilizer, amine catalyst and water are adjusted and the aqueous premixture is added to the final foam-producing formulation in an amount sufficient to satisfy the respective functions of such components and to provide a foamed product of desired quality.

The polyester polyols employed in producing flexible foams in accordance with the process of this invention are the reaction products of polyfunctional organic carboxylic acids and polyhydric alcohols. The polyester polyols contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from about 25 to about 150, and preferably have hydroxyl numbers between about 40 and about 80. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = \frac{56.1 \times 1000 \times f}{M.W.}$$

wherein
OH = hydroxyl number of the polyol,
$f$ = average functionality, that is, the average number of hydroxyl groups per molecule of polyol, and
M.W. = average molecular weight of the polyol.

Typical of the polyfunctional organic carboxylic acids that can be employed in producing polyester polyols useful in preparing the foams of this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The polyhydric alcohols (organic polyols) that can be employed in producing the polyester polyol starting material used in the process of this invention include the monomeric polyhydric alcohols such as, for example, glycerol; 1,2,6-hexanetriol; ethylene glycol; diethylene glycol; trimethylol propane; trimethylolethane; pentaerythritol; propylene glycol; 1,2-, 1,3- and 1,4- butylene glycols; 1,5-pentanediol; sorbitol; and the like, including mixtures thereof.

Other polyhydric alcohols that can be employed in producing the polyester polyols useful in preparing the foams of this invention are the polymeric polyhydric alcohols which include the linear and branched chain polyethers having a plurality of acyclic ether oxygens and at least two alcoholic hydroxyl radicals. Illustrative of such polyether polyols are the poly(oxyalkylene) polyols containing one or more chains of connected oxyalkylene radicals which are prepared by the reaction of one or more alkylene oxides with acyclic and alicyclic polyols. Examples of the poly(oxyalkylene) polyols include the poly(oxyethylene) glycols prepared by the addition of ethylene oxide to water, ethylene glycol or diethylene glycol; poly(oxypropylene) glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the poly(oxybutylene) glycols and copolymers such as poly(oxyethyleneoxybutylene) glycols and poly(oxypropylene-oxybutylene) glycols. Included in the term "poly(oxybutylene) glycols" are polymers of 1,2-butyleneoxide and 2,3-butyleneoxide.

Illustrative of further polyester polyol reactants that are useful in producing flexible polyester urethane foam in accordance with the process of this invention are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1,2,6-hexanetriol; pentaerythritol; sorbitol; glycosides such as methyl, ethyl, propyl, butyl and 2-ethylhexyl arabinoside, xyloside, fructoside, glucoside, and rhammoside; sucrose; mononuclear polyhydroxybenzenes such as resorcinol, pyrogallol, phloroglucinol, hydroquinone, 4,6-di-tertiarybutylcatechol, and catechol; polynuclear hydroxybenzenes ("polynuclear" designating at least two benzene nuclei) such as the di-, tri- and tetra-phenylol compounds in which two to four hydroxybenzene groups are attached either directly by means of single bonds or through an aliphatic hydrocarbon radical containing one to twelve carbon atoms, such compounds being typically illustrated by 2,2-bis(p-hydroxyphenyl)propane, bis(p-hydroxyphenol)-methane and the various diphenols and diphenol methanes disclosed in U.S. Pat. Nos. 2,506,486 and 2,744,882, respectively. Another type of polyester polyol reactant is that produced by reaction of a polycarboxylic acid and the polyether adducts formed by reaction of ethylene oxide, propylene oxide or butylene oxide with phenol-formaldehyde condensation products such as the novolaks.

The organic polyisocyanates that are useful in producing flexible polyester urethane foam in accordance with the process of this invention are organic compounds that contain at least two isocyanato groups. Such compounds are well known in the art of producing polyurethane foams, and are conveniently represented by the general formula:

wherein: $i$ has an average value of at least two and is usually no more than six, and Q' represents an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate; 1,4-tetramethylene diisocyanate; 1-methyl-2,4-diisocyanatocyclohexane; bis(4-isocyanatophenyl)methane; 4-methoxy-1,4-phenylenediisocyanate; 4-chloro-1,3-phenylenediisocyanate; 4-bromo-1,3-phenylenediisocyanate; 5,6-dimethyl-1,3-phenylenediisocyanate; 2,4-tolylene diisocyanate; 2,6-tolylene diisocyanate; mixtures of the 2,4- and 2,6-tolylene diisocyanates; crude tolylene diisocyanates; 6-isopropyl-1,3-phenylenediisocyanate; durylene diisocyanate; triphenylmethane-4,4',4''-triisocyanate; and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

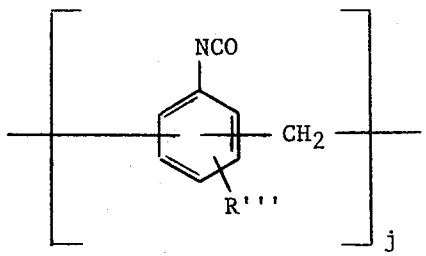

wherein R''' is hydrogen and/or lower alkyl and $j$ has an average value of at least 2.1. Preferably the lower alkyl radical is methyl and $j$ has an average value of from 2.1 to about 3.2. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially (e.g., NIAX Isocyanate AFPI), and are low viscosity (50–500 centipoises at 25°C.) liquids having average isocyanato functionalities between about 2.25 and about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the polyester polyol and organic polyisocyanate usually constitute the major proportion by weight of the polyurethane-forming reaction mixture. In general, the polyisocyanate and polyester polyol reactants are employed in relative amounts such that the ratio of total —NCO equivalents to total active hydrogen equivalent (of the polyester polyol and any water, when used) is from 0.8 to 1.5, preferably from 0.9 to 1.2, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is preferably within the range from about 90 to about 120.

The urethane-forming reaction is effected in the presence of a minor amount of a catalyst comprising an amine. This component of the polyurethane-forming reaction mixture is usually a tertiary-amine. Suitable amine catalysts include one or more of the following: N-methylmorpholine; N-ethylmorpholine; N-octadecylmorpholine; triethylamine; tributylamine; trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. Also useful are the betatertiary-amino nitriles wherein the 2-cyanoalkyl group is bonded to acyclic tertiary amino nitrogen or to nitrogen of a morpholine or piperazine nucleus. Such catalysts are described in copending application Ser. No. 369,556, filed June 13, 1973 of W. R. Rosemund, M. R. Sandner and D. J. Trecker, and are exemplified by 3-(N,N-dimethylamino)propionitrile as such or in combination with other tertiary amines such as bis[2-(N,N-dimethylamino)ethyl]ether. Although metal-containing catalysts such as stannous octoate are usually employed in the preparation of flexible polyether urethane foam, such metal catalysts are not preferred in the manufacture of flexible polyester foam.

It is to be understood that the aforesaid amines may be used as essentially the sole amine catalyst of the reaction mixtures employed in this invention or any combination of two or more such amines may be employed. The amine catalyst may also be introduced into the reaction mixture in the form of a solvent solution containing from about 10 to about 80 weight percent of total active catalyst. Suitable carrier solvents of amine catalysts include water-soluble glycols such as diethylene glycol; dipropylene glycol; and 2-methyl-2,4-pentanediol ("hexylene glycol").

The catalyst may also be used in combination with other additives such as any of the non ionic organic surfactants described above with specific reference to the solution compositions of this invention. Example of non ionics which are especially useful as components of the catalyst solutions are the oxyethylated nonylphenol compounds represented by the general formula, $C_9H_{19}$-$C_6H_4$-$(OC_2H_4)_k$-OH, wherein $k$ is a number having an average value of from about 9 up to about 20 or more, including average values of $k$ which are either whole or fractional numbers such as 9, 10.5, 15 and the like. When used, the non ionic organic surfactant may be present in an amount from about 10 to about 80 weight percent, based on the total weight of the catalyst solution. The catalyst solution may also include minor amounts of polysiloxane-polyoxyalkylene block copolymers including the cyano-substituted block copolymers of this invention.

It is to be understood that any of the aforesaid amine catalysts or solutions thereof can be added directly to the foam-producing reaction mixture or they can be added in premixed form with water and the foam stabilizers of this invention. In the latter event, the catalyst is preferably added as a component of the above-described homogeneous aqueous premixtures of this invention.

The amine catalyst is present in the final foam-producing reaction mixture in an amount of from about 0.2 to about 8 parts by weight of active catalyst (that is, the amine exclusive of other components present in solutions thereof) per 100 parts by weight of the polyester polyol reactant.

Foaming can be accomplished by employing a minor amount of a polyurethane blowing agent such as water, in the reaction mixture, the reaction of water and isocyanate generating carbon dioxide blowing agent, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80°F. and about −60°F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. Another useful class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane.

The amount of blowing agent employed in the foaming reaction will vary with factors such as the density that is desired in the foamed product. Usually, however, from about 1 to about 30 parts by weight of the blowing agent per 100 parts by weight of the polyester polyol starting material is preferred.

The flame retardants that can be employed in producing flame-retarded flexible polyester foams in accordance with the teachings of this invention can be chemically combined in one or more of the other materials used (e.g., in the polyol or polyisocyanate), or they can be used as discrete chemical compounds added as such to the foam formulation. The organic flame-retardants usually contain phosphorus or halogen, both phosphorus and halogen, or phosphorus and nitrogen. usually, the halogen, when present, is chlorine and/or bromine. Flame-retardants of the discrete chemical variety include: 2,2-bis(bromomethyl)-1,3-propanediol; 2,3-dibromopropanol; tetrabromophthalic anhydride; brominated phthalate ester diols such as those produced from tetrabromophthalic anhydride, propylene oxide and propylene glycol; tetrabromobisphenol-A; 2,4,6-tribromophenol; pentabromophenol; brominated anilines and dianilines; bis(2,3-dibromopropyl)ether of sorbitol; tetrachlorophthalic anhydride; chlorendic acid; chlorendic anhydride; diallyl chlorendate; chlorinated maleic anhydride; tris(2-chloroethyl)phosphate [(ClCH$_2$CH$_2$O)$_3$P(O)]; tris(2,3-dibromopropyl)phosphate; tris(2,3-dichloropropyl)phosphate; tris(1-bromo-3-chloroisopropyl)phosphate; tris(1,3-dichloroisopropyl)phosphate; bis(2,3-dibromopropyl)phosphoric acid or salts thereof; oxypropylated phosphoric and polyphosphoric acids; polyol phosphites such as tris(dipropylene glycol)-phosphite; polyol phosphonates such as bis(dipropylene glycol)hydroxymethyl phosphonate; di-poly(oxyethylene)-hydroxymethyl phosphonate; di-poly(oxypropylene)phenyl phosphonate; di-poly(oxypropylene)chloromethyl phosphonate; di-poly(oxypropylene)butyl phosphonate; and O,O-diethyl-N,N-bis(2-hydroxyethyl)aminomethyl phosphonate. Also suitable are compounds having the formulas:

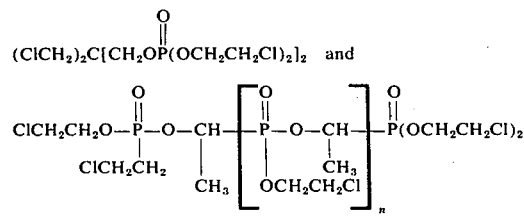

which are available from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. Illustrative of suitable inorganic phosphorus-containing flame-retardants is the ammonium polyphosphate available from Monsanto Chemical Company under the name Phoscheck P30. It is to be understood that other falme-retardants known to the art may be used and that the aforesaid compounds may be employed individually or in combination with one another.

The flame-retarding agent can be present in the foam formulations described herein in an amount from about 1 to about 30 parts by weight per 100 parts by weight of the polyester polyol reactant, the particular amount employed depending largely on the efficiency of any given agent in reducing flammability.

Of the above flame-retardants, those of the discrete chemical compound variety which contain groups reactive with hydroxy or isocyanato groups can be used as reactants in producing the polyester polyols or can be reacted with organic polyisocyanates to produce modified polyols or polyisocyanates having chemically combined flame-retardant groups. Such modified polyester and polyisocyanates are useful as reactants in the process of this invention. In such cases, due regard must be given to the possible effect of the functionality of the compound on the other properties (e.g., degree of flexibility) of the resulting foam.

If desired, other additional ingredients can be employed in minor amounts in producing the polyurethane foams in accordance with the process of this invention. Illustrative of such additives that can be employed are: compression set additives (e.g., hexylene glycol); additives to regulate cell structure so as to coarsen cells and thereby reduce the tendency of the foam to split (e.g., paraffin oil); fillers; dyes; pigments; anti-discoloration additives including antiscorch and anti-oxidation agents; and the like.

With respect to the aforementioned anti-discoloration additives it is noted that, in the commericial manufacture of polyurethane slabstock, discoloration due to scorching may be observed in or toward the center sections of the bun where the heat due to the exotherm of the polyurethane-forming reaction is more intense and held longer. The discoloration becomes more evident as the size of the foam bun increases and is especially noticeable when the bun is cut into relatively thin sections as in the application of polyester polyol-derived foam as a textile interliner. In general, such discoloration is inhibited by the addition to the foam formulation of minor amounts of various antiscorch additives such as: phenols substituted with tertiary-butyl groups such as 2,6-di-tert-butyl-4-methylphenol ("Ionol"), and 2,4,6-tri-tert-butyl-phenol; tert-butylcatechol; p-methoxyphenol; phenothiazine; oxirane-containing compounds such as, in particular, propylene oxide; triorgano-substituted phosphites and phosphines such as, for example, triphenylphosphite and triphenylphosphine; and other known anti-scorch or anti-oxidizing agents including any combination of the aforesaid compounds. When used, such additives are present in the foam formulation in an amount between about 0.0005 to about 1 part by weight, per 100 parts by weight of polyol reactant.

The process described herein for the production of flexible polyester urethane foam is usually carried out as a "one-shot" process in which the polyester polyol and polyisocyanate reactants are independently added to the foam-producing reaction mixture. The foaming and urethaneforming reactions occur without the application of external heat. Often the resulting foam is cured by heating the foam at a temperature between about 100°C. and about 150°C. for about 10 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components reacted in accordance with the above-described process for producing flexible polyester urethane foams are not narrowly critical. The polyester polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine catalyst and the organosilicone polymeric foam stabilizers are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the organosilicone polymers of this invention are present in a foam-stabilizing amount, that is, in an amount sufficient to stabilize the foam. The preferred amounts of these various components are as given hereinabove.

The flexible polyester urethane foams produced in accordance with this invention can be used in the same areas as conventional flexible polyester urethane foams. For example, they can be used as textile interliners, cushioning materials for seating, for packaging of delicate objects, and as gasketing materials.

The following examples are merely illustrative of the present invention and are not intended as a limitation upon the scope thereof.

Molecular weights given in the examples for various polymer compositions of this invention, wee measured by Gel Permeation Chromatography (abbreviated in the examples as "GPC") using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent using styragel packed columns. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. Gel Permeation Chromatography as a technique for measuring molecular weight is discussed in "Polymer Fractionation" (ed. Manfred J. R. Cantow, Academic Press, Inc. New York 1967), pages 123–173, Chapter B4, entitled "Gel Permeation Chromatography," by K. H. Altgelt and J. C. Moore. In determining the molecular weights given in the examples, the particular procedure employed was that described in the article entitled "Characterization of Silicones by Gel Permeation Chromatography" by F. Rodriguez et al. in *I &EC Product and Development*, Vol. 5, No. 2, page 121 (June 1966) using five styragel packed columns (Waters Associates, Inc.) having a pore size of $10^3$A, $3 \times 10^3$A, $10^4$A, $3 \times 10^4$A, and $8 \times 10^3$A, respectively.

It is to be understood that in the formulas included in the date which follow, "Me" designates a methyl group, $-CH_3$.

PREPARATION OF Si-H FLUIDS

Polymethylpolysiloxane hydride fluids, designated in the examples as Si-H Fluids I-V, were prepared having the average composition:

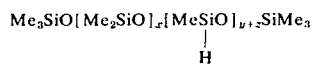

wherein the particular average values of $x$ and $y+z$ are given in Table I below. The respective fluids were prepared by the acid-catalyzed equilibration of reactants (1)–(3) listed below employing concentrated (98 weight percent) sulfuric acid as the catalyst.

Reactant (1): Hexamethyldisiloxane, $Me_3SiOSiMe_3$, as the source of the endblocking trimethylsiloxy units, $Me_3SiO_{1/2}$—.

Reactant (2): Cyclic polymers of dimethylsiloxane distilled to provide the cyclic tetramer, $[Me_2SiO]_4$, as the predominant component (boiling point, 174–176°C./760 mm. Hg), as the source of the dimethylsiloxy units.

Reactant (3): Polymeric methylhydrogensiloxane having an average Si-H content of about 357–361 cc. $H_2$ per gram, as the source of the methylhydrogensiloxy units.

Preparation of Si-H Fluid I

The aforesaid Reactants (1)–(3) were charged in the following amounts to a one liter capacity, reaction flask equipped with a mechanical stirrer and nitrogen blow-by:

Reactant (1): 81.2 grams, corresponding to 0.5 mole of $Me_3SiOSiMe_3$ or 1.0 mole-equivalent of $Me_3SiO_{1/2}$;

Reactant (2): 185.3 grams, corresponding to 2.5 mole-equivalents ($x'$) of the unit, $Me_2SiO_{2/2}$; and Reactant (3): 300.6 grams, corresponding to 5.0 mole-equivalents ($y'+z'$) of the unit, $Me(H)SiO_{2/2}$.

Also added was 11.3 grams of concentrated sulfuric acid catalyst corresponding to about 2 weight percent of the total weight of reactants. The reaction mixture was stirred at room temperature overnight (about 22 hours). The reaction mixture was then maintained under static conditions for about one hour to allow the sulfuric acid catalyst to settle after which the liquid reaction product was separated by decantation. The liquid product was neutralized with excess sodium bicarbonate while stirring and was then pressure filtered. Based upon the proportions of reactants employed, normalized to two moles of M units, the fluid product, designated Si-H Fluid I, has the average composition, $$Me_3SiO[Me_2SiO]_5[MeSiO]_{10}SiMe_3$$
$$|$$
$$H$$

corresponding to a theoretical $Me(H)SiO$ content of 52.99 weight percent. Upon Si-H analysis, the product provided 198 cc. $H_2$/gram on the basis of which the found $Me(H)SiO$ content is 53.04 weight percent.

As used herein, the weight percentages expressed as "% $Me(H)SiO$, Found" are derived from the Si-H analyses (cc. $H_2$ per gram) of the respective Si-H fluids in accordance with the conversion:

Weight Percent $Me(H)SiO$ Found = 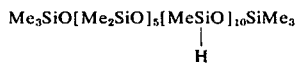

where the factor 373.3 is the theoretical number of cubic centimeters of hydrogen provided per gram of fluid consisting of 100 percent $Me(H)SiO$ (that is, 22,400 cc. of hydrogen divided by the unit molecular weight of 60). The weight percentages expressed as "% $Me(H)SiO$, theoretical" correspond to the weight [60 (y+z)] contributed by $Me()SiO$ divided by the calculated molecular weight of the fluid product times 100.

Preparation of Si-H Fluids II-V

The procedure employed in the preparation of Si-H Fluids II-V was substantially the same and comprised effecting the acid-catalyzed equilibration of Reactants (1)-(3) in a 500 ml. capacity, 3-necked flask equipped with a mechanical stirrer, thermometer and nitrogen blow-by. The respective reaction mixtures contained about 1.2 weight percent of concentrated sulfuric acid catalyst and were stirred at room temperature for about 24 hours. The liquid products were then neutralized with excess sodium bicarbonate while stirring for about one hour and were then filtered to separate solids. The products, designated Si-H Fluids II-V, respectively, were then analyzed for Si-H content and their viscosity measured.

The above detailed data pertaining to Si-H Fluid I, as well as corresponding data including the relative proportions of Reactants (1)-(3) employed in providing Si-H Fluids II-V and the Si-H analyses thereof are given in Table I which follows.

TABLE I

Preparation of Si—H Fluids Having the Average Composition,
$Me_3SiO[Me_2SiO]_x[Me\underset{|}{S}iO]_{y+z}SiMe_3$, where the average values
                                                    H
of x and y+z are given below.

| Si—H Fluid Designation REACTANTS | I | II | III | IV | V |
|---|---|---|---|---|---|
| $Me_3SiOSiMe_3$: grams | 81.2 | 16.2 | 16.2 | 16.2 | 16.2 |
| moles | 0.5 /1/ | 0.1 /2/ | 0.1 /2/ | 0.1 /2/ | 0.1 /2/ |
| $Me_2SiO_{2/2}$: grams /3/ | 185.3 | 59.3 | 37.0 | 44.5 | 37.0 |
| mole-eq. (x') | 2.5 | 0.8 | 0.5 | 0.6 | 0.5 |
| $Me(H)SiO_{2/2}$: grams /4/ | 300.6 | 72.1 | 72.1 | 60.13 | 78.1 |
| mole-eq. (y'+z') | 5 | 1.2 | 1.2 | 1.0 | 1.3 |
| CATALYST |  |  |  |  |  |
| Conc. $H_2SO_4$, grams | 11.3 | 1.7 | 1.5 | 1.4 | 1.5 |
| Si—H Fluid Product |  |  |  |  |  |
| Moles of Units/$2Me_3SiO_{1/2}$ |  |  |  |  |  |
| x (average) | 5 | 8 | 5 | 6 | 5 |
| y+z (average) | 10 | 12 | 12 | 10 | 13 |
| Si—H Analysis |  |  |  |  |  |
| cc. $H_2$/gram | 198 | 174 | 202 | 174 | 207 |
| % Me (H)SiO: Found /5/ | 53.04 | 46.61 | 54.11 | 46.61 | 55.45 |
| Theo. | 52.99 | 48.84 | 57.5 | 49.71 | 59.45 |
| Viscosity, centipoise | — | 9.5 | 7.5 | 7.5 | 7.5 |

/1/ Corresponding to 1.0 mole-equivalent of $Me_3SiO_{1/2}$.
/2/ Corresponding to 0.2 mole-equivalent of $Me_3SiO_{1/2}$.
/3/ Grams used of Reactant (2), corresponding to the indicated mole-equivalents of the unit, $Me_2SiO_{2/2}$.
/4/ Grams used of Reactant (3), corresponding to the indicated mole-equivalents of the unit, $Me(H)SiO_{2/2}$.
/5/ Corresponding to the cc. $H_2$/gram found.

The following Examples 1–5 illustrate the preparation of 3-(2-cyanoethoxy)propyl-modified copolymers of the invention, designated as Surfactants A through E, respectively. These copolymers were prepared by the reaction of the above-described Si-H Fluids I-V, allyl 2-cyanoethyl ether ($CH_2$=$CHCH_2OCH_2CH_2CN$) and a methyl-capped, allyl-started polyoxyethylene ether reactant. The latter reactant is referred to herein as Polyether A and contains a small percentage (up to about 10 mole percent) of hydroxyl-terminated polyether chains due to incomplete methyl capping of the allyl-endblocked polyether intermediate. Based upon the allyl analysis (9.8 weight percent), the average molecular weight of Polyether A is about 418 and its average composition is,

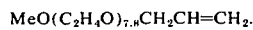

$MeO(C_2H_4O)_{7.n}CH_2CH$=$CH_2$.

In describing the preparation of Surfactants A–E, the indicated mole-equivalents of Me(H)SiO corresponding to the amount of Si-H fluid reactant employed are based on the "% Me(H)SiO, Found" values of the fluids given in Table I.

EXAMPLE 1

PREPARATION OF SURFACTANT A

The following ingredients were charged to a 500 ml. capacity reaction flask equipped with a mechanical stirrer, thermometer, Vigreaux column and nitrogen blow-by:

a. Si-H Fluid I (y+z= 10) in an amount of 28.3 grams (0.025 mole), corresponding to 0.25 mole-equivalent of Me(H)SiO;

b. Polyether A (75.2 grams, 0.18 mole);

c. Allyl 2-cyanoethyl ether in an amount of 13.3 grams (0.12 mole); and d. toluene solvent (50 grams).

The respective amounts of reactants (b) and (c) include 20 mole percent in excess of the desired stoichiometric reaction which was to react 60 mole percent (0.15 mole) of the Si-H content of (a) with reactant (b), and the remaining 40 percent with reactant (c).

The reaction mixture was heated to 85°C. and while at that temperature 50 p.p.m. of platinum catalyst as chloroplatinic acid was added. The reaction exothermed to 115°C. and after cooling to 100°C., the mixture was kept at that temperature for one hour. A standard Si-H test (KOH-ethanol technique) showed the presence of 2.2 cc. $H_2$/2 ml. sample. The mixture was heated at 130°C. for one hour (residual Si-H 1.9 cc. $H_2$/2 ml. sample) and for an additional two hours at the same temperature after which residual Si-H was reduced to 0.9 cc. $H_2$/2 ml. sample. The product was stripped free of solvent at 140°C. for 3 hours employing a nitrogen sparge, cooled to ambient temperature, neutralized and filtered. The liquid product had a Brookfield viscosity (at 25°C.) of 105 centipoise, and an average molecular weight (G.P.C.) of 4200. The product of this example is designated Surfactant A. As expressed on the normalized basis of two moles of trimethylsiloxy units and based on the aforesaid desired stoichiometry, Surfactant A comprises a copolymer to which the following average composition is assigned:

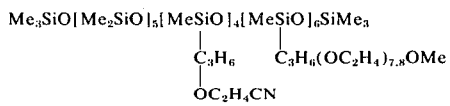

In addition to the hydrosilation of unsaturated reactants (b) and (c) proceeding concurrently at substantially the same reaction rate, the hydrosilation may also occur concurrently at different reaction rates or it may proceed to first hydrosilate substantialy all of either reactant (b) or reactant (c) followed by reaction of remaining silanic hydrogen with the other of the unsaturated reactants. Irrespective of the relative rates of reaction, however, the average composition of Surfactant A is within the scope of the polymers provided by the present invention. Thus, as expressed on the basis of different rates of reaction between silanic hydrogen of reactant (a) and respective reactants (b) and (c), the average number of the 3-(2-cyanoethoxy)propyl methylsiloxy Y units (that is, the value of $y$) contained in Surfactant A is within the range from about 2.8 to about 4.8, and the average number of the polyether-substituted Z units (that is, the value of $z$) is correspondingly within the range from about 7.2 to about 5.2. These limits of $y$ and $z$ are readily calculated. For example, hydrosilation of the total charge (0.18 mole) of reactant (b) leaves 0.07 mole of Si-H for reaction with (c) and thus the average value of $y$ is 2.8 [that is, 0.07/0.25 times 10], and $z$ has a corresponding average value of 7.2. Likewise, hydrosilation of the total charge (0.12 mole) of reactant (c), provides a polymer composition in which the average value of $y$ is 4.8 [that is, 0.12/0.25 times 10] and the corresponding average value of $z$ is 5.2. Partial hydrosilation of reactants (b) and (c) provides polymer products in which the average value of $y$ is intermediate 2.8 and 4.8 and in which the corresponding value of $z$ is intermediate 7.2 and 5.2.

EXAMPLE 2

PREPARATION OF SURFACTANT B

The following were charged to the reaction vessel described under Example 1:

a. Si-H Fluid II ($y+z = 12$) in an amount of 29.5 grams (0.02 mole), corresponding to 0.23 mole-equivalent of Me(H)SiO;

b. Polyether A in an amount of 70.2 grams (0.168 mole);

c. Allyl 2-cyanoethyl ether in an amount of 13.3 grams (0.12 mole); and d. Toluene solvent (47.7 grams).

The respective amounts of reactants (b) and (c) include 25 mole percent of each reactant in excess of the desired stoichiometric reaction which was to effect reaction of (b) and (c) with the Si-H content of Si-H Fluid II in a mole ratio of 7:5, respectively. The reaction mixture was heted to 90°C. and while at that temperature, 200 p.p.m. of Pt catalyst as chloroplatinic acid was added. After the initial exotherm (112°C.), the reaction mixture was heated at 100°C. for one hour. After this period of time, the standard test for residual Si-H indicated the presence of 0.8 cc. H₂/2 ml. sample of product. The liquid product was then neutralized with sodium bicarbonate and filtered, followed by removal of solvent by rotary evaporation at about 50°C. and 5 mm. mercury pressure. The product, designated herein as Surfactant B, had a Brookfield viscosity (at 25°C.) of 150 centipoise and an average molecular weight (G.P.C.) of 4600. As expressed on the normalized basis of two moles of trimethylsiloxy units and based on the aforesaid desired stoichiometry, Surfactant B comprises a copolymer to which the following average composition is assigned:

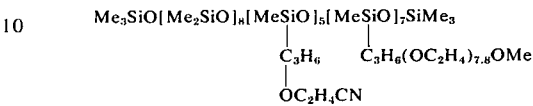

When expressed on the basis of different reaction rates between silanic hydrogen of reactant (a) with respective reactants (b) and (c), the average number of the 3-(2-cyanoethoxy)propyl methylsiloxy units contained in Surfactant B is within the range from about 3.3 to about 6.3 and the average number of the polyether-methylsiloxy units is correspondingly within the range from about 8.7 to about 5.7.

EXAMPLE 3

PREPARATION OF SURFACTANT C

The polymer product of this example was prepared under the reaction conditions and following substantially the same precedure described under Example 2, employing a reaction mixture containing:

a. Si-H Fluid III ($y+z = 12$) in an amount of 31.3 grams (0.025 mole) corresponding to 0.282 mole-equivalent of Me(H)SiO;

b. Polyether A in an amount of 87.7 grams (0.21 mole);

c. Allyl 2-cyanoethyl ether in an amount of 16.6 grams (0.15 mole);

d. Toluene solvent (67 grams); and e. 200 p.p.m. Pt catalyst.

The respective amounts of reactants (b) and (c) include about 27 mole percent of each reactant in excess of the desired stoichiometric reaction which was to effect reaction of (b) and (c) with Si-H Fluid III in a mole ratio of 7:5, respectively. The residual Si-H content of the liquid product was 0.2 cc. H₂ per 2 ml. sample. The final product, designated herein as Surfactant C, had a Brookfield viscosity (at 25°C.) of 125 centipoise and an average molecular weight (G.P.C.) of 4400. As expressed on the normalized basis of two moles of trimethylsiloxy units and based on the aforesaid desired stoichiometry, Surfactant C comprises a copolymer to which the following average composition is assigned:

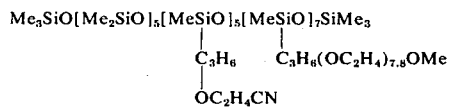

When expressed on the basis of different reaction rates between silanic hydrogen of reactant (a) with respective reactants (b) and (c), the average number of the 3-(2-cyanoethoxy)propyl methylsiloxy units contained in Surfactant C is within the range from about 3.1 to about 6.4 and the average number of polyether-methylsiloxy units is correspondingly within the range from about 8.9 to about 5.6.

EXAMPLE 4

PREPARATION OF SURFACTANT D

The polymer product of this example was prepared substantially as described under Example 2 employing a reaction mixture containing:

a. Si-H Fluid IV ($y+z = 10$) in an amount of 30.2 grams (0.025 mole) corresponding to 0.23 mole-equivalent of Me(H)SiO;

b. Polyether A in an amount of 75.2 grams (0.18 mole);

c. Allyl 2-cyanoethyl ether in an amount of 13.3 grams (0.12 mole);

d. Toluene solvent (51 grams); and e. Pt catalyst (about 200 p.p.m.)

The respective amounts of reactants (b) and (c) include about 30 mole percent of each reactant in excess of the desired stoichiometric reaction which was to effect reaction of 60 mole percent of the Si-H content of reactant (a) with reactant (b), and the remaining 40 percent with reactant (c). The residual Si-H content of the liquid product was 1.0 cc. $H_2/2$ ml. sample. The final product, designated herein as Surfactant D, had a Brookfield viscosity of 140 centipoise and an average molecular weight (G.P.C.) of 4000. As expressed on the normalized basis of two moles of trimethylsiloxy units and based on the aforesaid desired stoichiometry, Surfactant D comprises a copolymer to which the following average composition is assigned:

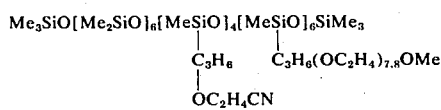

When expressed on the basis of different reaction rates between silanic hydrogen of reactant (a) with respective reactants (b) and (c), the average number of the 3-(2-cyanoethoxy)propyl methylsiloxy units contained in Surfactant D is within the range from about 2.2 to about 5.2 and the average number of polyether-methylsiloxy units is correspondingly between about 7.8 and about 4.8.

EXAMPLE 5

PREPARATION OF SURFACTANT E

The polymer product of this example was prepared substantially as described under Example 2 employing a reaction mixture containing:

a. Si-H Fluid V ($y+z = 13$) in an amount of 32.8 grams (0.025 mole) corresponding to 0.305 mole-equivalent of Me(H)SiO;

b. Polyether A in an amount of 100.3 grams (0.24 mole);

c. Allyl 2-cyanoethyl ether in an amount of 16.6 grams (0.15 mole);

d. Toluene solvent (64 grams); and e. Pt catalyst (about 200 p.p.m.)

The respective amounts of reactants (b) and (c) include about 28 mole percent of each reactant in excess of the desired stoichiometric reaction which was to effect reaction of (b) and (c) with Si-H Fluid V in a mole ratio of 8:5, respectively. The residual Si-H content of the liquid product was 0.7 cc. $H_2/2$ ml. sample. The final product, designated herein as Surfactant E, had a Brookfield viscosity of 182 centipoise and an average molecular weight (G.P.C.) of 4600. As expressed on the normalized basis of two moles of trimethylsiloxy units and based on the aforesaid desired stoichiometry, Surfactant E comprises a copolymer to which the following average composition is assigned:

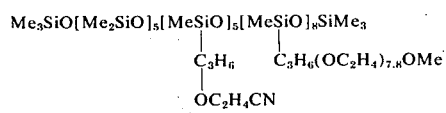

When expressed on the basis of different reaction rates between silanic hydrogen of reactant (a) with respective reactants (b) and (c), the average number of the 3-(2-cyanoethoxy)propyl methylsiloxy units contained in Surfactant E is within the range from about 3 to about 6.4 and the average number of the polyether-methylsiloxy units is correspondingly between about 10 and about 6.6.

EXAMPLES 6–10

In accordance with these examples, flame-retarded, flexible polyester polyurethane foams were produced using the above-described Surfactants A through E of the present invention as the respective foam stabilizing surfactant component of the foam-producing reaction mixture, designated herein as Foam Formulation A, which had the composition given in Table II which follows.

TABLE II - FOAM FORMULATION A

| Component | Parts By Weight |
| --- | --- |
| Surfactant | 0.35 |
| Polyester Polyol /1/ | 100.0 |
| N-ethylmorpholine | 1.9 |
| Hexadecyldimethylamine | 0.3 |
| Water | 3.6 |
| Tolylene diisocyanate (Index 105) /2/ | 45.2 |
| Tris(2-chloroethyl)phosphate | 7.0 |

/1/ The polyester polyol employed was a commercially available polyester resin produced from adipic acid, diethylene glycol and trimethylol propane in a mole ratio of approximately 1:1:0.2. This polyester has a hydroxyl number of about 50 to 56, a molecular weight of about 2,000, an acid number not greater than 2 and a viscosity of about 17,000 centistokes at about 25°C. This particular polyester is known as "Witco Fomrez No. 50" (Witco Chemical Corporation).

/2/ This component was a mixture of 2,4-tolylene diisocyanate (80 weight percent) and 2,6-tolylene diisocyanate. Index 105 means that the amount of mixture employed was 105 percent of the stoichiometric amount required to react with the polyester polyol and water present in the foam formulation.

The runs of Examples 6–10 were carried out in accordance with substantially the same general procedure which entailed the following steps. The surfactant, amine catalysts and water were premixed in a 50 milliliter beaker. The polyester polyol reactant was weighed into a tared 32-ounce capacity container. The flame-retardant [tris (2-chloroethyl)phosphate] and tolylene diisocyanate reactant were also weighed into the container and mixed with a spatula until homogeneous. Further mixing was done on a drill press equipped with a double three-bladed marine-type propeller about three inches in diameter. The mixing in the drill press was accomplished at 1000 revolutions per minute for eight seconds. Then the premixture of surfactant, catalyst and water was added and mixing was continued for seven additional seconds. The reaction mixture was poured into a 12 in. × 12 in. × 12 in. cardboard box, was allowed to rise and was then cured for about 30 minutes at 130°C. Samples of the foam products were prepared for breathability and burning extent determinations.

As used in the examples, the following terms have the indicated significance:

"Rise" denotes the foam height and is directly proportional to potency of the surfactant.

"Breathability" denotes the porosity of a foam, being roughly proportional to the number of open cells in a foam, and was measured in accordance with the NOPCO breathability test procedure described by R. E. Jones and G. Fesman, "Journal of Cellular Plastics" (January, 1965). In accordance with this test, breathability is measured as follows: A 2 inch × 2 inch × 1 inch piece of foam is cut from near the center of the bun. Using a Nopco Foam Breathability Tester, Type GP-2 Model 40GD10, air is drawn through the foam sample at a pressure differential of 0.5 inches of water less than atmospheric pressure. The air flow is parallel to the direction of original foam rise. The degree of openness of the foam (or foam breathability) is measured by the rate of air flow through the foam and is reported in standard cubic feet per minute (SCFM). "CPI" denotes "cells per inch", that is, the number of cells per linear inch of the foam. CPI is directly proportional to the fineness of the cell structure.

"Burning Extent" was determined in accordance with standard flammability test procedure ASTM D-1692-68 except that five test specimens of foam were used instead of ten. Burning extent denotes the burned length (in inches) of the foam and is reported as the average of the results obtained with the various test specimens of a given foam. On the basis of this test, an average burning extent of less than 5.0 inches qualifies the foam for a self-extinguishing ("SE") rating. When the burning extent of at least one test specimen is 5.0 inches or greater, the foam is assigned a burning ("B") rating and usually no further specimens of that foam are tested.

"Burning Time" denotes the average time (in seconds) taken to give the specified burning extent.

The results of Examples 6–10 are given in Table III which follows.

TABLE III

Stabilization Of Flame-Retarded Polyester Foam Using Surfactants A–E

| EXAMPLE | 6 | 7 | 8 | 9 | 10 |
|---|---|---|---|---|---|
| Surfactant | A | B | C | D | E |
| Foam Rise, inches | 5.4 | 5.5 | 5.7 | 5.6 | 5.6 |
| Foam Quality | | | | | |
| Breathability, SCFM | 3.3 | 5.0 | 1.3 | 4.7 | 1.6 |
| CPI | 45–50 | 50–55 | 40–45 | 45–50 | 40–45 |
| Density, lbs./ft.$^3$ | 1.95 | 1.90 | 2.06 | 1.85 | 1.96 |
| Flammability Rating (ASTM D-1692-68) | SE | SE | SE | SE | SE |
| Burning extent, inches | 2.4 | 2.1 | 1.3 | 2.4 | 2.4 |
| Burning time, seconds | 46 | 54 | 33 | 56 | 30 |

The data of Table III demonstrate that Surfactants A to E comprising the 3-(2-cyanoethoxy)propyl-modified polymethylsiloxane-polyoxyethylene copolymers of this invention are effective stabilizers of flame-retarded, flexible polyester foam and possess the further desirable property of allowing for the formation of self-extinguishing flame-retarded foam of low burning extent.

EXAMPLES 11–15

In these examples, a potency determination was made of Surfactants A to E using Foam Formulation B, identified in Table IV, which follows.

TABLE IV - FOAM FORMULATION B

| Component | Parts By Weight |
|---|---|
| Surfactant | 0.35 |
| Polyester polyol /1/ | 100.0 |
| N-ethylmorpholine | 1.9 |
| Hexadecyldimethylamine | 0.3 |
| Water | 5.0 |
| Tolylene diisocyanate (Index 105) /2/ | 59.4 |

/1/ As identified in footnote /1/ of Table II.
/2/ As identified in footnote /2/ of Table II.

As indicated, Foam Formulation B contains 5 parts by weight of water per 100 parts by weight of polyol reactant. The 5 parts water system is usually more difficult to stabilize than the more conventional formulations containing less water and thus provides a relatively sensitive test of potency. The foams were prepared following the above-described foaming procedure except that no flame-retardant was used. The results are given in Table V which follows.

TABLE V

| Example | 11 | 12 | 13 | 14 | 15 |
|---|---|---|---|---|---|
| Surfactant | A | B | C | D | E |
| Rise Inches | 8.9 | 8.3 | 8.8 | 8.7 | 8.8 |
| Breathability SCFM | 1.8 | 2.1 | 0.7 | 2.1 | 1.5 |
| Density lbs./ft.$^3$ | 1.42 | 1.40 | 1.44 | 1.40 | 1.43 |
| CPI | 15–20 | 15–20 | 20–25 | 20–25 | 20–25 |

The data of Table V demonstrate that the surfactants of this invention have excellent potency as reflected by the rise values and that the non flame-retarded flexible polyester foam products are also of good quality.

EXAMPLES 16–17

For the purpose of illustrating the efficacy of solution compositions comprising the cyanoalkoxyalkyl-polymethylsiloxane-polyoxyalkylene copolymers of the invention as stabilizers of polyester polyol-based urethane foam, above-described Surfactants C and E were blended with an organic surfactant, tall oil and hexylene glycol. The resultant blends are designated herein as Surfactants F and G and had the composition given in Table IV below. For the purpose of comparison, an excellent stabilizer of polyester polyol-based formulations was used and is designated herein as Surfactant AA. The silicon-containing component of Surfactant AA is a siloxane-polyoxyalkylene block copolymer (No. I) in which the siloxane backbone is substituted only with methyl groups. Surfactant AA is of the type described in U.S. Pat. No. 3,594,334 and its average composition is also given in Table VI which follows.

TABLE VI

| Blended Surfactant | F | G | AA /1/ |
|---|---|---|---|
| Si-Copolymer Component | C /2/ | E /3/ | I /4/ |
| Parts By Weight | 35 | 35 | 35 |
| Organic Surfactant Anionic /5/ | | | |
| Parts BY Weight | 25 | 25 | 35 |
| Non Ionic, pts. by wt. /6/ | 10 | 10 | — |
| Tall oil, pts. by wt. | 15 | 15 | 15 |

TABLE VI-continued

| Blended Surfactant | F | G | AA /1/ |
|---|---|---|---|
| Hexylene glycol, pts. by wt. | 15 | 15 | 15 |

/1/ Not a surfactant of the invention.
/2/ Prepared in accordance with Example 3.
/3/ Prepared in accordance with Example 5.
/4/ Block copolymer having the average composition, $Me_3SiO[Me_2SiO]_{5.1}$ $[MeO(C_2H_4O)_{7.2}C_3H_6Si(Me)O]_{7.5}SiMe_3$
/5/ In Blended Surfactants F and G, the anionic surfactant was, "Petronate L" which is a sodium petroleum sulfonate having an average molecular weight of 420 and a mineral oil content of 33 weight percent. In Blended Surfactant AA the anionic surfactant was "Bryton 430" which is also a sodium sulfonate of a hydrocarbon mixture having an average molecular weight of 435 and a mineral oil content of 32.7 weight percent.
/6/ An ethylene oxide adduct of nonylphenol in which the average number of moles of ethylene oxide per mole of nonylphenol is about 10.5.

A potency determination was made employing Blended Surfactants F and G as the respective surfactant components of Foam Formulation B (Table IV) employing the blended surfactant at a concentration of one part by weight and following the above-described foaming procedure. The results are given in the following Table VII which also includes corresponding data for Surfactant AA as Run K-1.

TABLE VII

POTENCY STUDY - FOAM FORMULATION B

| Ex. | Blended Surfactant /1/ | Rise (inches) | Breath-ability (SCFM) | Density (pcf) | CPI |
|---|---|---|---|---|---|
| 16 | F /2/ | 9.0 | 2.4 | 1.39 | 15–20 |
| 17 | G /2/ | 9.0 | 2.3 | 1.38 | 20–25 |
| Run K-1 | AA /2/ | 9.1 | 1.8 | 1.38 | 15–20 |

/1/ One part by weight.
/2/ 0.35 part by weight of silicon-containing component present.

As shown by the data of Table VII, the potency of Blended Surfactants F and G compared favorably with that of comparative Surfactant AA. In regard to Surfactant AA it is noted that when it is used as the surfactant component of flame-retarded Foam Formulation A (Table II) at a level of one part by weight to provide 0.35 parts by weight of the polymethylsiloxane-polyoxyethylene copolymer contained therein, the following results were obtained:

| | |
|---|---|
| Foam Rise | = 6.1 inches |
| Foam breathability | = 0.9 SCFM |
| Foam density | = 1.99 pounds/cubic foot |
| CPI | = 40–45 |
| Flammability (ASTM D-1692-68) Rating | = B |
| Burning time | = 126 seconds |

These results as well as those of Table VII show that, whereas Surfactant AA is capable of stabilizing both flame-retarded and non flame-retarded polyester urethane foam, it does not possess the further desirable property of allowing for the formation of flame-retarded foam of a sufficiently low burning extent to qualify for a self-extinguishing rating by ASTM D-1692-68.

In accordance with the following Examples 18 and 19, further illustrative cyanoalkoxyalkyl-substituted polyalkylsiloxane-polyoxyalkylene copolymers of the invention, designated herein as Surfactants H and J, were prepared. These preparations comprised the platinum-catalyzed hydrosilation reaction between 3-(2-cyanoethoxy)propyl-substituted polymethylsiloxane hydrides, referred to respectively as Si-H Fluids VI and VII, and a methoxy-capped, allyl alcohol-started polyoxyethylene ether (referred to as Polyether B) having the average composition,

The said Si-H reactants were prepared as follows.

PREPARATION OF Si-H FLUID VI

In a 500 ml. capacity 3-necked reaction flask fitted with a mantle, stirrer, thermometer, addition funnel, condenser and nitrogen valves, there were combined 36.7 grams of $Me_3SiO[Me(H)SiO]_{12}SiMe_3$, and 100 ml. of toluene. In the addition funnel were placed 34.7 grams of allyl 2-cyanoethyl ether, $CH_2=CHCH_2OCH_2CH_2CN$, corresponding to about 10 mole percent in excess of the desired stoichiometric reaction which was to react 7/12 of the silanic hydrogen of the Si-H reactant with the ether. After heating the contents of the flask to 95°C., 0.2 ml. of platinum catalyst (prepared by reacting chloroplatinic acid with octyl alcohol as described in U.S. Pat. No. 3,220,972) was added and the addition of the allyl 2-cyanoethyl ether begun. There was a smooth exotherm to 105°C. with addition being completed in 25 minutes at 90°–105°C. After an additional 1.5 hours at 90°C., the reaction product was cooled, treated with one weight percent sodium bicarbonate and 0.5 weight percent of filter aid (Hyflo Super-Cel) and activated charcoal (Darco G-60), followed by pressure filtration and vacuum distillation. The distillate (6.7 grams) boiled up to 37°C./0.7 mm. mercury pressure, and consisted mainly of isomerized and reduced derivatives of the allyl 2-cyanoethyl ether reactant. The residual liquid product (60.2 grams) had a Brookfield viscosity of 236 centipoise and, upon analysis for Si-H content, provided 85.8 cc. $H_2$/gram. Based upon the aforesaid desired stoichiometric reaction, the liquid product which is referred to herein as Si-H Fluid VI, is assigned the following average composition,

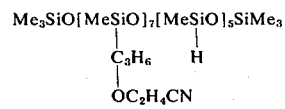

PREPARATION OF Si-H FLUID VII

Following substantially the same procedure and applying the hydrosilation reaction conditions described above with reference to Si-H Fluid VI, 49.4 grams of an equilibrated polymethylsiloxane hydride having the average composition,

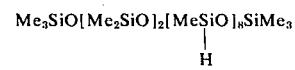

was reacted with 22.2 grams of allyl 2-cyanoethyl ether. The desired stoichiometric reaction was to react 9/6 of the silanic hydrogen of the Si-H reactant with the ether. Work-up of the reaction mixture as above-described provided 7.0 grams of distillate, and 57.3 grams of residual liquid product. The latter product had a Brookfield viscosity of 55 centipoise and, upon analysis for Si-H content, provided 103 cc. $H_2$/gram. Based upon the aforesaid desired stoichiometric reaction, the liquid product which is referred to herein as Si-H Fluid VII, is assigned the average composition,

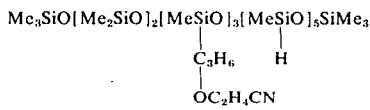

EXAMPLE 18

PREPARATION OF SURFACTANT H

In a 200 ml. reaction vessel fitted with a mantle, stirrer, thermometer, addition funnel, condenser and nitrogen blow-by, there were combined 26.1 grams of above-described Si-H Fluid VI, 57.0 grams of Polyether B and 60 ml. of toluene. After heating the reaction mixture to 95°C., there was then added 0.3 ml. of platinum catalyst prepared by the reaction of chloroplatinic acid and octyl alcohol. After 1.5 hours of heating at 95°–100°C., residual Si-H remained constant at 0.4 cc. H₂ per 0.5 ml. sample. The reaction product was cooled, treated with sodium bicarbonate, filter aid and charcoal, and was then pressure filtered and vacuum stripped. The liquid reaction product (73.5 grams), designated herein as Surfactant H, had a viscosity of 325 centipoise, an average molecular weight (G.P.C.) of 3400, and is assigned the average composition,

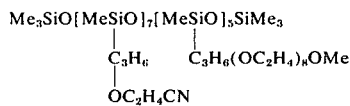

EXAMPLE 19

PREPARATION OF SURFACTANT J

The copolymer of this example was prepared and worked-up as described under Example 18 employing 21.7 grams of Si-H Fluid VII and 57.0 grams of Polyether B in 60 ml. of toluene. The liquid reaction product (71.5 grams), referred to herein as Surfactant J, had a viscosity of 162.5 centipoise, an average molecular weight (G.P.C.) of 2700, and is assigned the following average composition,

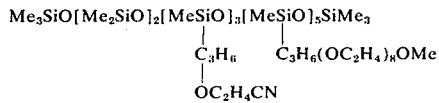

EXAMPLES 20–21

In accordance with these examples, flame-retarded, flexible polyester polyol urethane foams were prepared employing Surfactants H and J as the respective foam stabilizers. The foam formulation employed was the same as Foam Formulation A of Table II hereinabove except that in place of "Witco Fomrez No. 50," the polyester polyol reactant was that marketed as "Wilmar Polyester 180" (Wilson-Martin Division of Wilson Pharmaceutical & Chemical Corporation). The latter polyester polyol has a hydroxyl number of 49–55, a typical viscosity at 25°C. (Brookfield LVF) of 19,000–23,000 centipoise and an acid number not greater than 2.0. In these foam preparations, the above-described general foaming procedure was followed. The results are given in the following Table VIII.

TABLE VIII

| Exampl | 20 | 21 |
|---|---|---|
| Surfactant | H | J |
| Rise, inches | 5.4 | 5.5 |
| Breathability, SCFM | 0.7 | 0.6 |
| Burning extent, inches | 1.0 | 1.0 |
| Burning time, seconds | 26.7 | 28.1 |

EXAMPLES 22–23

In accordance with these examples, a potency determination was made of Surfactants H and J. The foam-producing reaction mixture which was employed had the same composition as non flame-retarded Foam Formulation B of Table VI hereinabove except that the polyester polyol reactant was "Wilmar Polyester 180" identified under Examples 20 and 21. The above-described general foaming procedure was substantially followed in each preparation. The results are:

TABLE IX

| Example | 22 | 23 |
|---|---|---|
| Surfactant | H | J |
| Rise, inches | 8.7 | 8.9 |
| Breathability, SCFM | 0.9 | 1.15 |
| CPI | 15–20 | 20–25 |

The results of Tables VIII and IX further illustrate the effectiveness of the copolymers of this invention as stabilizers of both flame-retarded and non flame-retarded flexible polyester polyol urethane foam.

What is claimed is:

1. Organosilicone compositions which comprise polysiloxane-polyoxyalkylene copolymers containing monofunctional siloxy units and difunctional siloxy units, an average of between about 2 and about 20 silicon-bonded cyano-bearing ether groups for every two moles of monofunctional units, said cyano-bearing ether groups having the formula, —(O)$_q$R'OR"CN, wherein $q$ is zero or one, R' is bivalent alkylene of 3 to 8 carbon atoms and R" is bivalent alkylene of 2 to 4 carbon atoms, and an average of between about 2 and about 30 silicon-bonded, organic-capped polyoxyalkylene blocks for every two moles of monofunctional units, the polyoxyalkylene content of said copolymers being constituted of at least 75 weight percent of oxyethylene units, said monofunctional units having at least two alkyls bonded to the respective silicon atoms thereof and the difunctional units having at least one alkyl bonded to the respective silicon atoms thereof, the remaining organic group bonded to silicon of the respective monofunctional and difunctional siloxy units being alkyl, said cyanobearing ether group or said polyoxyalkylene block.

2. As novel compositions, polysiloxane-polyoxyalkylene copolymers having the average composition,

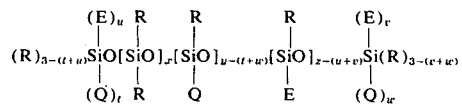

wherein:

R is alkyl having from one to 10 carbon atoms;

Q is a cyano-bearing ether group having the formula, —(O)$_q$R'OR"CN, where $q$ is zero or one, R' is bivalent alkylene having from 3 to 8 carbon atoms and R" is bivalent alkylene of 2 to 4 carbon atoms;

E is a polyoxyalkylene block having the formula, —(R°)$_p$-OC$_a$H$_{2a}$)$_b$OG, where R° comprises a bivalent alkylene group a carbon atom of which is bonded to silicon, G is an organic cap, $p$ is zero or one, —(OC$_a$H$_{2a}$)b— is a polyoxyalkylene chain constituted of at least 75 weight percent of oxyethylene;

$t, u, v, w$, the sum $t+u$ and the sum $v+w$ are independently zero or one, and each of the sums $t+w$ and $u+v$ is independently zero, one or two;

$x$ is zero or a positive number having an average value up to about 20;

$y$ has an average value from about 2 to about 20; and $z$ has an average value from about 2 to about 30.

3. A composition as defined in claim 2 in which R has from one to four carbon atoms.

4. A composition as defined in claim 3 in which R is methyl.

5. A composition as defined in claim 2 in which $q$ of said cyano-bearing ether group is zero.

6. A composition as defined in claim 5 in which said cyano-bearing ether group is 3-(2-cyanoethoxy)propyl.

7. A composition as defined in claim 2 in which $q$ of said cyano-bearing ether group is one.

8. A composition as defined in claim 7 in which said cyano-bearing ether group is 3-(2-cyanoethoxy)propoxy.

9. A composition as defined in claim 2 in which each of $u$ and $v$ is one.

10. A composition as defined in claim 2 in which each of $t$ and $w$ is one.

11. A composition as defined in claim 2 in which each of $t, u, v$ and $w$ is zero.

12. A composition as defined in claim 2 in which $x$ is zero.

13. A composition as defined in claim 2 in which $x$ is a positive number.

14. Siloxane-polyoxyalkylene copolymers having the average composition,

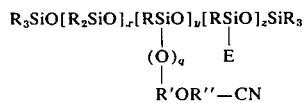

wherein: R is alkyl having from 1 to 10 carbon atoms; R' is bivalent alkylene of from 3 to 8 carbon atoms; R" is bivalent alkylene of from 2 to 4 carbon atoms; E is an organic-capped polyoxyalkylene block at least 75 weight percent of the polyoxyalkylene content of which is constituted of oxyethylene; $q$ is zero or one; $x$ is zero or a positive number having an average value up to about 20; $y$ has an average value from about 2 to about 20; and $z$ has an average value from about 2 to about 30.

15. A copolymer as defined in claim 14 in which R' has from 3 to 4 carbon atoms.

16. A copolymer as defined in claim 14 in which R" has two carbon atoms.

17. A copolymer as defined in claim 14 in which —R'OR"-CN is 3-(2-cyanoethoxy)propyl.

18. A copolymer as defined in claim 14 in which $x$ is zero.

19. A copolymer as defined in claim 14 in which $x$ is a positive number.

20. Siloxane-polyoxyethylene copolymers having the average composition,

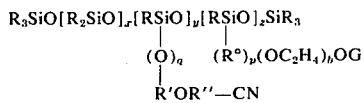

wherein: R is alkyl having from one to four carbon atoms; R' is bivalent alkylene of 3 to 8 carbon atoms; R" is bivalent alkylene of 2 to 4 carbon atoms; R° comprises a bivalent alkylene group of from 2 to 6 carbon atoms a carbon atom of which is bonded to silicon; G is an organic cap; $q$ is zero or one; $p$ is zero or one; $b$ has an average value from about 3 to about 30; $x$ is zero or a positive number having an average value up to about 20; $y$ has an average value from about 2 to about 20, and $z$ has an average value from about 2 to about 30.

21. A copolymer as defined in claim 20 in which $q$ is zero and $p$ is one.

22. A copolymer as defined in claim 20 in which $q$ and $p$ are both zero.

23. A copolymer as defined in claim 20 in which $q$ and $p$ are both one.

24. A copolymer as defined in claim 20 in which $q$ is one and $p$ is zero.

25. A copolymer as defined in claim 20 in which G is alkyl having from one to four carbon atoms.

26. A copolymer as defined in claim 20 in which G is aryl.

27. A copolymer as defined in claim 20 in which G is aralkyl.

28. Siloxane-polyoxyethylene copolymers having the average composition,

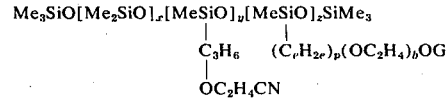

wherein: Me is methyl; G comprises a monovalent hydrocarbon group having from 1 to 12 carbon atoms; $b$ has an average value from about 3 to about 30; $p$ is zero or one; $e$ has a value from 2 to 4; $x$ is zero or a positive number having an average value up to about 10; $y$ has an average value from about 2 to about 10; and $z$ has an average value from about 2 to about 15.

29. A copolymer as defined in claim 28 in which $p$ is one and $e$ is three.

30. A copolymer as defined in claim 29 in which $x$ is zero.

31. A copolymer as defined in claim 29 in which $x$ is a positive number.

32. A copolymer as defined in claim 28 in which G is said monovalent hydrocarbon group.

33. A copolymer as defined in claim 28 in which G is methyl.

34. A copolymer as defined in claim 28 in which G is phenyl.

35. A copolymer as defined in claim 28 in which G is benzyl.

36. A copolymer as defined in claim 28 in which G is R$^{\infty}$C(O)— where R$^{\infty}$ is said monovalent hydrocarbon group.

37. A copolymer as defined in claim 28 in which G is R°°NHC(O)— where R°° is said monovalent hydrocarbon group.

38. Siloxane-polyoxyethylene copolymers having the average composition,

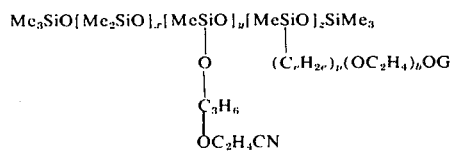

wherein: Me is methyl; G comprises a monovalent hydrocarbon group having from 1 to 12 carbon atoms; $b$ has an average value from about 3 to about 30; $p$ is zero or one; $e$ has a value from 2 to 4; $x$ is zero or a positive number having an average value up to about 10; $y$ has an average value from about 2 to about 10; and $z$ has an average value from about 2 to about 15.

39. A copolymer as defined in claim 38 in which $p$ is one and $e$ is three.

* * * * *

UNITED STATES PATENT OFFICE
CERTIFICATE OF CORRECTION

Patent No. 3,979,419    Dated September 7, 1976

Inventor(s) Bela Prokai and Bernard Kanner

It is certified that error appears in the above-identified patent and that said Letters Patent are hereby corrected as shown below:

Title Page, opposite the heading "Assignee", for "Corp." read -- Corporation --. Column 4, lines 6-9, that portion of the formula reading $$\begin{array}{c} (E)_u \\ | \\ SiO \\ | \\ (Q)_t \end{array} \quad \text{should read} \quad \begin{array}{c} (E)_u \\ | \\ SiO \\ | \\ (Q)_t \end{array}$$

Column 5, lines 4-7, that portion of the formula reading $$\begin{array}{c} (H)_u \\ | \\ SiO \\ | \\ (Q)_t \end{array} \quad \text{should read} \quad \begin{array}{c} (H)_u \\ | \\ SiO \\ | \\ (Q)_t \end{array}$$

Column 5, line 55, for "therof" read -- thereof --. Column 9, Formula VI-A, that portion of the formula reading $$\begin{array}{c} [RSiO]_y \\ | \\ (O) \\ | \end{array} \quad \text{should read} \quad \begin{array}{c} [RSiO]_y \\ | \\ (O)_q \\ | \end{array}$$

Column 12, line 52, for "D" read -- C --. Column 13, line 61, for "Go" read -- GO --. Column 14, lines 39-40, that portion of the formula reading $$\begin{array}{c} [RSiO]_z SiR_3 \\ | \\ (OC_aH2a)_b OG \end{array} \quad \text{should read} \quad \begin{array}{c} [RSiO]_z SiR_3 \\ | \\ (OC_aH2a)_b OG \end{array}$$

UNITED STATES PATENT OFFICE
CERTIFICATE OF CORRECTION

Patent No. 3,979,419                    Dated September 7, 1976

Inventor(s) Bela Prokai et al.

It is certified that error appears in the above-identified patent and that said Letters Patent are hereby corrected as shown below:

Column 14, line 61, for the subscript "y-z" read -- y+z --.
Column 15, line 24, for "Go" read -- GO --.  Column 16, line 39, for the first occurrence of "ether" read -- ethers --.
Column 20, line 21, for "cyanoalkoxyakyl" read -- cyanoalkoxyalkyl --.  Column 31, line 66, for "Example" read -- Examples --.  Column 33, line 4, for "usually" read -- Usually --; line 53, for "falme-" read -- flame- --.
Column 35, line 24, for "wee" read -- were --; line 57, for "date" read -- data --.  Column 38, line 55, after "Si-H" read an equal sign -- = --.  Column 39, line 59, for "heted" read -- heated --.  Column 44, line 52, for "IV" read -- VI --.
Column 48, Table VIII, in the heading, for "Exampl" read -- Example --; line 18, for "VI" read -- IV --; lines 62-65, the formula correctly reads

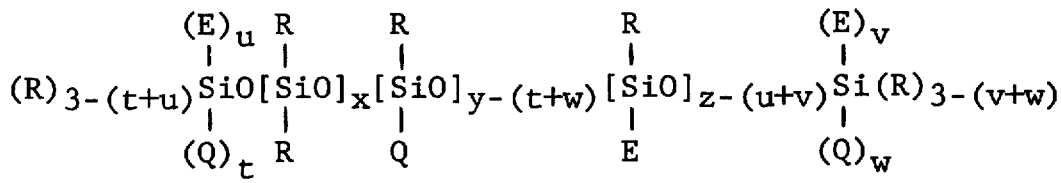

UNITED STATES PATENT OFFICE
CERTIFICATE OF CORRECTION

Patent No. 3,979,419     Dated September 7, 1976

Inventor(s) Bela Prokai et al.

It is certified that error appears in the above-identified patent and that said Letters Patent are hereby corrected as shown below:

Column 49, line 6, that portion of the formula reading $-(R°)_p-O$     should read     $-(R°)_p-(O$ Signed and Sealed this nineteenth Day of July 1977

[SEAL]

Attest:

RUTH C. MASON  
*Attesting Officer*

C. MARSHALL DANN  
*Commissioner of Patents and Trademarks*